United States Patent
Kaneko et al.

(10) Patent No.: US 9,206,306 B2
(45) Date of Patent: Dec. 8, 2015

(54) RESIN COMPOSITION, FILM, BAG PRODUCT AND PRODUCTION PROCESS OF RESIN COMPOSITION

(71) Applicants: Hiroyuki Kaneko, Yokkaichi (JP);
Hiroshi Nakano, Yokkaichi (JP);
Tomohide Yoshida, Wakayama (JP);
Tarou Amano, Nagahama (JP)

(72) Inventors: Hiroyuki Kaneko, Yokkaichi (JP);
Hiroshi Nakano, Yokkaichi (JP);
Tomohide Yoshida, Wakayama (JP);
Tarou Amano, Nagahama (JP)

(73) Assignee: MITSUBISHI CHEMICAL CORPORATION, Minato-ku (JP)

( * ) Notice: Subject to any disclaimer, the term of this patent is extended or adjusted under 35 U.S.C. 154(b) by 0 days.

(21) Appl. No.: 14/614,807

(22) Filed: Feb. 5, 2015

(65) Prior Publication Data
US 2015/0210844 A1   Jul. 30, 2015

Related U.S. Application Data

(62) Division of application No. 13/142,347, filed as application No. PCT/JP2009/071505 on Dec. 24, 2009, now Pat. No. 8,974,881.

(30) Foreign Application Priority Data

Dec. 26, 2008 (JP) ................. 2008-335336
Dec. 26, 2008 (JP) ................. 2008-335337
Dec. 26, 2008 (JP) ................. 2008-335338
Jul. 1, 2009 (JP) ................. 2009-157141

(51) Int. Cl.
*C08L 35/02* (2006.01)
*C08J 5/18* (2006.01)
(Continued)

(52) U.S. Cl.
CPC .. *C08L 35/02* (2013.01); *C08J 5/18* (2013.01);
*C08L 3/02* (2013.01); *C08L 67/02* (2013.01);
*C08J 2367/02* (2013.01);
(Continued)

(58) Field of Classification Search
CPC ................ C08L 35/02; C08L 2203/16; C08L 2205/025; C08L 2207/04; Y10T 428/31786
See application file for complete search history.

(56) References Cited

U.S. PATENT DOCUMENTS 7,176,251 B1    2/2007  Bastioli et al.
2002/0006989 A1  1/2002  Bastioli et al.
(Continued)

FOREIGN PATENT DOCUMENTS

CN    1613901 A     5/2005
JP    07 330954    12/1995
(Continued)

OTHER PUBLICATIONS

International Search Report issued Mar. 2, 2010 in PCT/JP09/071505 filed Dec. 24, 2009.
(Continued)

*Primary Examiner* — Michael C Miggins
(74) *Attorney, Agent, or Firm* — Oblon, McClelland, Maier & Neustadt, L.L.P.

(57) ABSTRACT

An object of the present invention is to provide a resin composition improved in film formability and/or mechanical property, particularly tensile elastic modulus or tearing strength, of the film. The present invention provides a resin composition including at least (A) an aliphatic polyester-based resin and (C) a starch, the aliphatic polyester-based resin (A) forming a matrix phase and the starch (C) forming a dispersed phase, wherein the average particle diameter of the dispersed phase is 1 μm or less.

22 Claims, 3 Drawing Sheets

(51) Int. Cl.
*C08L 3/02* (2006.01)
*C08L 67/02* (2006.01)

(52) U.S. Cl.
CPC ...... *C08L 2203/16* (2013.01); *C08L 2205/025* (2013.01); *C08L 2207/04* (2013.01); *Y10T 428/1345* (2015.01)

(56) References Cited

U.S. PATENT DOCUMENTS

| | | |
|---|---|---|
| 2006/0009610 A1 | 1/2006 | Hayes |
| 2007/0123612 A1 | 5/2007 | Bastioli et al. |
| 2007/0129468 A1 | 6/2007 | Bastioli et al. |
| 2008/0147034 A1 | 6/2008 | Wang et al. |
| 2008/0214702 A1 | 9/2008 | Bastioli et al. |
| 2009/0054618 A1 | 2/2009 | Noda et al. |

FOREIGN PATENT DOCUMENTS

| | | |
|---|---|---|
| JP | 2000 509427 | 7/2000 |
| JP | 2001 254005 | 9/2001 |
| JP | 2001-254005 | 9/2001 |
| JP | 2002 003606 | 1/2002 |
| JP | 2003 055470 | 2/2003 |
| JP | 2004-359730 | 12/2004 |
| JP | 2006 212897 | 8/2006 |
| JP | 2008 013602 | 1/2008 |
| JP | 2008-013602 | 1/2008 |
| JP | 2008 019339 | 1/2008 |
| JP | 2009 155530 | 7/2009 |
| JP | 2009 155531 | 7/2009 |
| JP | 2009 173911 | 8/2009 |
| JP | 2009 185305 | 8/2009 |
| WO | 2007/026650 | 3/2007 |
| WO | 2008/037749 | 4/2008 |
| WO | WO 2008/037744 A2 | 4/2008 |

OTHER PUBLICATIONS

Office Action issued Apr. 22, 2014, in Japanese Patent Application No. 2009-293374 with English translation.
Chinese Office Action issued Oct. 29, 2014 in connection with corresponding Chinese Patent Application No. 20090151401.4, filed Dec. 24, 2009.
Chinese Office Action issued Jul. 12, 2012, in Patent Application No. 200980151401.4 (with English-language translation).
Office Action issued Jan. 23, 2013, in Chinese Patent Application No. 200980151401.4 with English translation.
Office Action issued on Jul. 19, 2013 in the corresponding Chinese Patent Application No. 200980151401.4 (with English Translation).
Japanese Office Action issued Feb. 4, 2014 in connection with corresponding Japanese Patent Application No. 2009-293374, filed Dec. 24, 2009.
Supplementary European Search Report issued Sep. 15, 2015 in connection with European Patent Application No. 09 83 4982, filed Dec. 24, 2009.

RESIN COMPOSITION, FILM, BAG PRODUCT AND PRODUCTION PROCESS OF RESIN COMPOSITION

The present application is a divisional application of Ser. No. 13/142,347, now allowed, which is a national stage application of PCT/JP09/071505, having a filing date of Dec. 24, 2009 and claiming priority to Japanese Patent Application Nos. 2008-335336; 2008-335337; 2008-335338; and 2009-157141; having filing dates of Dec. 26, 2008; Dec. 26, 2008; Dec. 26, 2008 and Jul. 1, 2009, respectively.

TECHNICAL FIELD

The present invention relates to a resin composition, a film obtained by molding the resin composition, a bag product and a production process of the resin composition.

BACKGROUND ART

In today's society, various materials such as paper, plastic and aluminum foil are used in the applications such as agricultural material, building material and packaging material for a variety of foods, drugs, sundry goods and the like taking a form of a liquid, a powder/granule or a solid. Above all, the plastic is excellent in the strength, water resistance, moldability, transparency, cost and the like and is being used as a molded article such as bag and container in a wide range of applications. The plastic that is at present widely used in the applications such as bag and container includes, for example, polyethylene, polypropylene, polystyrene, polyvinyl chloride and polyethylene terephthalate. However, the molded article composed of the plastic is not biodegraded or hydrolyzed in a natural environment or is degraded at an extremely slow speed and therefore, remains in the soil when buried after use or spoils the sight when dumped. Even when incinerated, there is a problem such as emission of a harmful gas or damage to the incinerator.

A biodegradable resin is attracting attention as an environment-friendly plastic capable of solving these problems. A film obtained by molding a biodegradable resin is degraded in the soil when buried in the soil after use and therefore, can contribute to preventing global warming or contamination of soil or air. For this reason, a film made of a biodegradable resin is often used for garbage bag, shopping bag and the like. However, many of these biodegradable resin-made films are generally poor in the mechanical properties, and in order to improve the mechanical properties of the biodegradable film while maintaining good biodegradability, a number of studies are being made.

For example, Patent Document 1 discloses a biodegradable resin composition obtained by mixing a starch, an aliphatic polyester and an aliphatic-aromatic polyester in a specific ratio. Also, Patent Document 2 discloses a biodegradable resin composition having a starch-containing dispersion phase and a continuous phase composed of a thermoplastic polymer. Furthermore, Patent Document 3 discloses a resin composition obtained by mixing a starch, an aliphatic polyester and a polyhydric alcohol in a specific ratio.

However, these biodegradable resin compositions disclosed in Patent Documents 1 to 3 suffer from poor dispersibility of the components in the resin composition, and improvement of mechanical properties is still insufficient. A biodegradable resin composition more improved in the mechanical properties and a molded body thereof are being demanded.

The aliphatic polyester resin is applied to various molded articles such as film, but when a molded article using the aliphatic polyester resin is left standing for a while, an oligomer, particularly a cyclic dimer, precipitates on the surface and disadvantageously whitens the surface, and an effective removal method therefor capable of keeping down the cost has not been developed so far. The method recently developed as an effective removal method includes a technique of reducing an oligomer, particularly a cyclic dimer, contained in the aliphatic polyester resin, and there is a known technique where the aliphatic polyester is washed with one or more kinds of solvents selected from an aliphatic ketone, a cyclic aliphatic ether and an aliphatic monoester at a temperature lower than the melting point of the aliphatic polyester and lower than the boiling point of the solvent (Patent Document 4). However, this method has a problem that the process of production steps is cumbersome and the organic solvent used remains in the resin.

A composition comprising a starch and an aliphatic polyester is prepared with an attempt to improve the mechanical property of the aliphatic polyester resin, but the above-described problem of whitening of the molded body due to an oligomer derived from the aliphatic polyester resin is not yet solved, and improvement of the mechanical property is also insufficient (Patent Document 5). In Patent Document 1, for the purpose of improving the mechanical property, a resin composition containing at least (A) an aliphatic polyester resin, (B) a thermoplastic resin other than the aliphatic polyester resin (A), (C) a starch and (D) a hydroxyl group-containing organic compound is disclosed.

PRIOR-ART DOCUMENTS

Patent Document

Patent Document 1: JP-A-2008-13602
Patent Document 2: JP-A-2000-509427
Patent Document 3: JP-A-2003-55470
Patent Document 4: JP-A-2002-003606
Patent Document 5: JP-A-7-330954

SUMMARY OF THE INVENTION

Problems that the Invention is to Solve

As a result of studies by the present inventors, the aliphatic polyester resin as a raw material of the resin composition described in Patent Document 1 is already reduced in the cyclic dimer content to about 700 ppm or less, and thanks to such a low content, a thermoplastic resin composition produced using this resin is considered to cause no precipitation of a cyclic dimer, but it has been found at the stage of using it in practice that a cumbersome working is required to reduce the cyclic dimer content in the raw material, causing a rise in cost, or an organic solvent remains in the resin, and this technique is unsuitable for mass production.

The present invention has been made by taking the above-described problems into consideration, and an object of the present invention is to provide a resin composition improved in at least either one characteristic of moldability and mechanical property of the film, particularly at least either tensile elastic modulus or tearing strength, a production process thereof, and a film and a bag product each obtained by molding the resin composition.

Also, the present invention has succeeded in developing a practicable resin composition having good moldability and mechanical strength and being reduced in the surface precipitation of an aliphatic polyester resin-derived oligomer by using a specific production process even from an aliphatic polyester resin that causes precipitation of a cyclic dimer to whiten the surface and is generally impractical. An object of the present invention is to provide this resin composition, a production process thereof, and a film and a bag each obtained by molding the resin composition.

Means for Solving the Problems

As a result of studies on the above-described objects, the present inventors have found that:

(1) when the microstructure in the resin composition is controlled to take on a specific morphology, the tensile elastic modulus and tearing strength are remarkably enhanced.

Furthermore, it has been found that:

(2) when the water amount of the resin composition working out to the raw material of a film is adjusted, the moldability and mechanical properties are enhanced, (3) when the components of the resin composition and the blending ratio thereof are optimized, the tensile elastic modulus and tearing strength are remarkably enhanced, and (4) when in addition to a resin composition comprising (A) an aliphatic polyester-based resin having a specific amount of a cyclic dimer and (C) a starch, (D) a plasticizer for starch is melt-kneaded, not only the mechanical strength is greatly improved as compared with the aliphatic polyester-based resin (A) but also, surprisingly, an oligomer derived from the aliphatic polyester-based resin can be prevented from precipitating on the molded body surface, because the oligomer dissolves in an organic compound containing a hydroxyl group.

Based on these findings, the present inventors have accomplished the following inventions.

[1] A resin composition comprising at least (A) an aliphatic polyester-based resin and (C) a starch, the aliphatic polyester-based resin (A) forming a matrix phase and the starch (C) forming a dispersed phase, wherein the average particle diameter of the dispersed phase is 1 μm or less.

[2] The resin composition as described in [1], wherein, preferably, the aliphatic polyester-based resin (A) has a diol unit and a dicarboxylic acid unit as constituent units.

[3] The resin composition as described in [1] or [2], wherein, preferably, the aliphatic polyester-based resin (A) is a polybutylene succinate-based resin, a polybutylene succinate adipate-based resin or a mixture of these two resins.

[4] The resin composition as described in any one of [1] to [3], wherein, preferably, the resin composition further contains (B) a thermoplastic resin other than an aliphatic polyester-based resin and the thermoplastic resin forms a dispersed phase distinct from the dispersed phase of the starch (C).

[5] The resin composition as described in [4], wherein, preferably, the resin composition contains an aliphatic-aromatic polyester-based resin as the thermoplastic resin (B) and the aliphatic-aromatic polyester-based resin forms a dispersed phase distinct from the dispersed phase of the starch (C).

[6] The resin composition as described in [5], wherein, preferably, the aliphatic-aromatic polyester-based resin has a diol unit and a dicarboxylic acid unit as constituent units.

[7] The resin composition as described in [5] or [6], wherein, preferably, the aliphatic-aromatic polyester-based resin is a polybutylene adipate terephthalate-based resin.

[8] The resin composition as described in any one of [1] to [7], wherein, preferably, the resin composition further contains (D) a plasticizer for starch.

[9] The resin composition as described in any one of [1] to [8], wherein, preferably, the content of a cyclic dimer contained in the aliphatic polyester-based resin (A) is from 1,000 to 10,000 ppm by mass based on the aliphatic polyester-based resin (A).

[10] The resin composition as described in [9], wherein, preferably, the content of a cyclic dimer contained in the resin composition is from 1,000 to 9,000 ppm by mass based on the entire resin composition.

[11] The resin composition as described in any one of [8] to [10], wherein, preferably, the thermoplastic resin (B) accounts for 1 to 100 parts by mass per 100 parts by mass of the aliphatic polyester-based resin (A) and the plasticizer (D) for starch accounts for from 10 to 55 mass % based on the starch (C).

[12] The resin composition as described in any one of [8] to [11], wherein, preferably, the aliphatic polyester-based resin (A) is a polybutylene succinate-based resin, the thermoplastic resin (B) other than the aliphatic polyester-based resin is a polybutylene terephthalate alkylate-based resin, the plasticizer (D) for starch is glycerin, and the mass ratios of respective components to the entire resin composition are from 30 to 45 mass % of the polybutylene succinate-based resin, from 15 to 25 mass % of the polybutylene terephthalate alkylate-based resin, from 30 to 45 mass % of the starch (C), and from 4 to 8 mass % of the glycerin.

[13] A film obtained by molding the resin composition described in any one of [1] to [12], wherein the tensile elastic modulus in accordance with JIS K7127 is 200 MPa or more and the Elmendorf tearing strength in accordance with JIS K7128 is 100 N/mm or more.

[14] The film as described in [13], wherein, preferably, the film is molded by inflation molding.

[15] A bag product comprising the film described in [13] or [14].

[16] A process for producing a resin composition comprising (A) an aliphatic polyester-based resin and (C) a starch, the process including mixing (X) a composition containing (C) a starch having an average particle diameter of 1 μm or less with (A) an aliphatic polyester-based resin.

[17] The process for producing a resin composition comprising (A) an aliphatic polyester-based resin and (C) a starch as described in [16], wherein, preferably, the water amount in the resin composition is adjusted to less than 1 mass %.

[18] The process for producing a resin composition comprising (A) an aliphatic polyester-based resin and (C) a starch as described in [16] or [17], wherein, preferably, an aliphatic polyester-based resin (A) having a cyclic dimer content of 1,000 to 10,000 ppm is used as the aliphatic polyester-based resin (A).

[19] The process for producing a resin composition as described in [18], wherein, preferably, a twin-screw extruder having a main raw material feed part for feeding raw materials, an auxiliary raw material feed part, and a devolatilization step part between the auxiliary raw material feed part and a die head is used, the starch (C) is fed from the main raw material feed part, the aliphatic polyester-based resin (A) is fed from the auxiliary raw material feed part, and devolatilization is performed in the devolatilization step part.

[20] The process for producing a resin composition as described in any one of [16] to [19], wherein, preferably, the melting temperature of the aliphatic polyester-based resin (A) is 130° C. or less.

[21] The process for producing a resin composition as described in any one of [16] to [20], wherein, preferably, the aliphatic polyester-based resin (A) has a diol unit and a dicarboxylic acid unit as constituent units.

[22] The process for producing a resin composition as described in any one of [16] to [21], wherein, preferably, the aliphatic polyester-based resin (A) is a polybutylene succinate-based resin, a polybutylene succinate adipate-based resin or a mixture of these two resins.

[23] The process for producing a resin composition as described in any one of [16] to [22], wherein, preferably, the resin composition further contains (D) a plasticizer for starch.

[24] The process for producing a resin composition as described in [23], wherein, preferably, the plasticizer (D) for starch is an organic compound having a hydroxyl group.

[25] The process for producing a resin composition as described in [23] or [24], wherein, preferably, the molecular weight of the plasticizer (D) for starch is 3,000 or less.

[26] The process for producing a resin composition as described in any one of [23] to [25], wherein, preferably, the plasticizer (D) for starch is at least one member selected from the group consisting of glycerin, sorbitol, pentaerythritol, propylene glycol and ethylene glycol.

[27] The process for producing a resin composition as described in any one of [16] to [26], wherein, preferably, the production process of a resin composition further comprises blending (B) a thermoplastic resin other than the aliphatic polyester-based resin (A) and the thermoplastic resin (B) is blended in a ratio of 1 to 100 parts by mass per 100 parts by mass of the aliphatic polyester-based resin (A).

[28] The process for producing a resin composition as described in [27], wherein, preferably, the thermoplastic resin (B) is an aliphatic-aromatic polyester-based resin.

[29] The process for producing a resin composition as described in [27] or [28], wherein, preferably, the thermoplastic resin (B) has a diol unit and a dicarboxylic acid unit as constituent units.

[30] The process for producing a resin composition as described in any one of [27] to [29], wherein, preferably, the thermoplastic resin (B) is a polybutylene adipate terephthalate-based resin.

Effects of the Invention

According to the present invention, a resin composition having good film formability and/or ensuring excellent mechanical properties, particularly tensile elastic modulus and tearing strength, of a film formed can be provided. This resin composition is excellent in dispersibility of each component in the composition and exhibits good moldability. Therefore, a molded body, particularly a film, obtained from the resin composition can be suitably used as various bag products such as garbage bag and shopping bag.

In a preferred embodiment of the present invention, a resin composition having good moldability and mechanical strength and being reduced in the precipitation of an oligomer derived from the aliphatic polyester-based resin (A), and a production process thereof, can be provided.

MODE FOR CARRYING OUT THE INVENTION

<Resin Composition>

Figure 1:
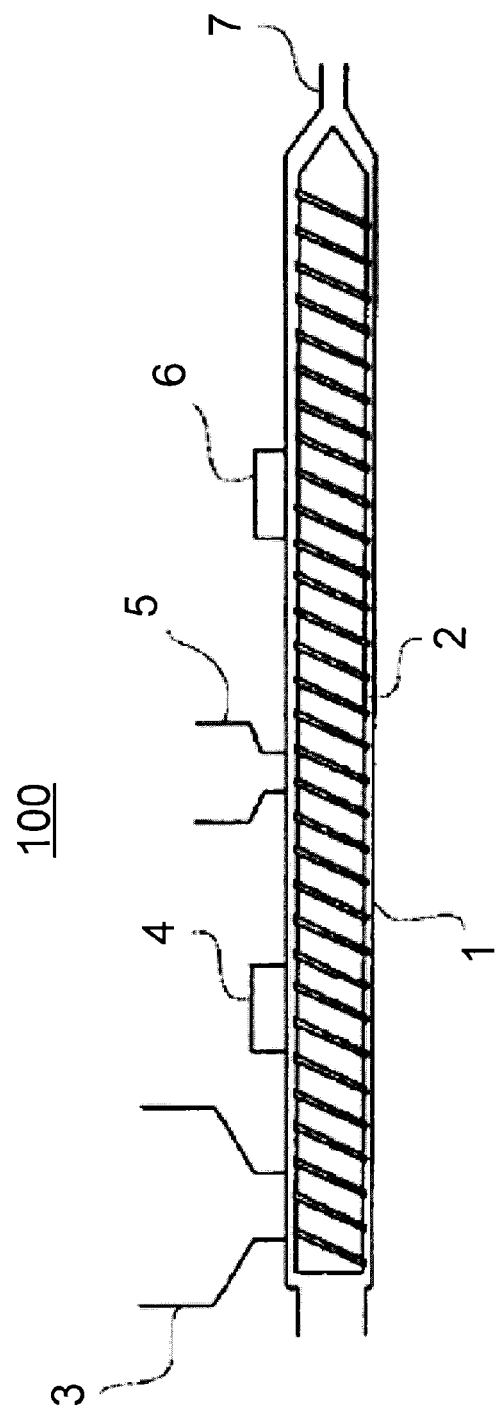
FIG. 1 is a schematic view of the twin-screw extruder 100 preferably used for the production of the resin composition of the present invention.

The resin composition of the present invention contains at least (A) an aliphatic polyester-based resin and (C) a starch and in the resin composition, the aliphatic polyester-based resin (A) and the starch (C) are forming a matrix phase and a dispersed phase, respectively. In the following, respective components, production process and the like are described in detail.

Incidentally, in the present specification, a resin composition containing a specific resin as a component is sometimes called by the name of a resin working out to the main component. The term "main component" as used herein means a component occupying 50 mass % or more, preferably 70 mass % or more, particularly 90 mass % or more, of the composition. For example, a "polybutylene succinate-based resin" indicates a resin composition where the main component is a polybutylene succinate-based resin.

Here, the "mass %", "ppm by mass" and "parts by mass" have the same meanings as "wt %", "ppm by weight" and "parts by weight", respectively, and when simply indicated as "ppm", this means "ppm by weight".

In the present specification, the term "polymer" is used as a concept including a polymer composed of a single species of a repeating unit (so-called "homopolymer") and a polymer composed of a plurality of kinds of repeating units (so-called "copolymer").

In the following, a partial structural unit of a polymer, which is derived from a certain monomer, is expressed by attaching a term "unit" to the monomer. For example, a partial structural unit derived from a dicarboxylic acid is referred to as "a dicarboxylic acid unit".

Also, monomers giving the same partial structural unit are collectively named by replacing the "unit" of the partial structural unit with "component". For example, monomers such as aromatic dicarboxylic acid and aromatic dicarboxylic acid diester all form an aromatic dicarboxylic acid unit, though the reaction in the process of forming a polymer may differ, and therefore, these aromatic dicarboxylic acid and aromatic dicarboxylic acid diester are collectively called "an aromatic dicarboxylic acid component".

<Aliphatic Polyester-Based Resin (A)>

In the present invention, the aliphatic polyester-based resin (A) indicates a polyester resin having substantially no aromatic ring in the molecule. The aliphatic polyester-based resin (A) for use in the present invention preferably contains a diol unit and a dicarboxylic acid unit and is more preferably composed of, for example, a chain aliphatic and/or alicyclic diol unit represented by the following formula (1) and a chain aliphatic and/or alicyclic dicarboxylic acid unit represented by the following formula (2).

$$-O-R^1-O- \quad (1)$$

[In formula (1), $R^1$ represents a divalent chain aliphatic hydrocarbon group and/or a divalent alicyclic hydrocarbon group, and when copolymerized, two or more $R^1$'s may be contained in the resin.]

$$-OC-R^2-CO- \quad (2)$$

[In formula (2), $R^2$ represents a divalent chain aliphatic hydrocarbon group and/or a divalent alicyclic hydrocarbon group, and when copolymerized, two or more $R^2$'s may be contained in the resin.]

Incidentally, in formulae (1) and (2), the term "and" in "a divalent chain aliphatic hydrocarbon group and/or a divalent alicyclic hydrocarbon group" means that both a divalent chain aliphatic hydrocarbon group and a divalent alicyclic hydrocarbon group are contained in one molecule of the constituent component. Also, hereinafter, the "chain aliphatic and/or alicyclic" is sometimes simply referred to as "aliphatic".

The aliphatic diol component giving the diol unit of formula (1) is not particularly limited but is preferably an aliphatic diol component having a carbon number of 2 to 10, more preferably an aliphatic diol component having a carbon number of 4 to 6. Specific examples thereof include 1,3-propanediol, 1,4-butanediol and 1,4-cyclohexanedimethanol, with 1,4-butanediol being preferred. Two or more kinds of aliphatic diol components may also be used.

The aliphatic dicarboxylic acid component giving the dicarboxylic acid unit of formula (2) is not particularly limited but is preferably an aliphatic dicarboxylic acid component having a carbon number of 2 to 10, more preferably an aliphatic dicarboxylic acid component having a carbon number of 4 to 8. Specific examples of the aliphatic dicarboxylic acid component include succinic acid, adipic acid, suberic acid, sebacic acid and dodecanedioic acid, with succinic acid and adipic acid being preferred. Two or more kinds of aliphatic dicarboxylic acid components may also be used.

Furthermore, the aliphatic polyester-based resin (A) for use in the present invention may contain an aliphatic oxycarboxylic acid unit. Specific examples of the aliphatic oxycarboxylic acid giving the aliphatic oxycarboxylic acid unit include lactic acid, glycolic acid, 2-hydroxy-n-butyric acid, 2-hydroxycaproic acid, 6-hydroxycaproic acid, 2-hydroxy-3,3-dimethylbutyric acid, 2-hydroxy-3-methylbutyric acid, a 2-hydroxyisocaproic acid, and lower alkyl esters or intramolecular esters thereof. In the case where these have an optical isomer, the optical isomer may be any of D-form, L-form and racemic form, and the morphology may be a solid, a liquid or an aqueous solution. Above all, lactic acid and glycolic acid are preferred. One of these aliphatic oxycarboxylic acids may be used alone, or a mixture of two or more thereof may be used.

The lower limit of the amount of the aliphatic oxycarboxylic acid is, based on all constituent components constituting the aliphatic polyester-based resin (A), usually 0 mol % or more, preferably 0.01 mol % or more, and the upper limit is usually 30 mol % or less, preferably 20 mol % or less.

The aliphatic polyester-based resin (A) for use in the present invention is preferably obtained by copolymerizing "a trifunctional or higher functional aliphatic polyhydric alcohol", "a trifunctional or higher functional aliphatic polyvalent carboxylic acid or an acid anhydride thereof", or "a trifunctional or higher functional aliphatic polyvalent oxycarboxylic acid", because the melt viscosity of the aliphatic polyester-based resin (A) obtained can be increased.

Specific examples of the trifunctional aliphatic polyhydric alcohol include trimethylolpropane and glycerin, and specific examples of the tetrafunctional aliphatic polyhydric alcohol include pentaerythritol. One of these may be used alone, or two or more thereof may be mixed and used.

Specific examples of the trifunctional aliphatic polyvalent carboxylic acid or an acid anhydride thereof include propanetricarboxylic acid or an acid anhydride thereof, and specific examples of the tetrafunctional polyvalent carboxylic acid or an acid anhydride thereof include cyclopentanetetracarboxylic acid or an acid anhydride thereof. One of these may be used alone, or two or more thereof may be mixed and used.

The trifunctional aliphatic oxycarboxylic acid component is classified into (i) a type having two carboxyl groups and one hydroxyl group in the same molecule and (ii) a type having one carboxyl group and two hydroxyl groups in the same molecule, and either type may be used. Specifically, malic acid and the like are preferably used. Also, the tetrafunctional aliphatic oxycarboxylic acid component is classified into (i) a type having three carboxyl groups and one hydroxyl group together in the same molecule, (ii) a type having two carboxyl groups and two hydroxyl groups together in the same molecule, and (iii) a type having three hydroxyl groups and one carboxyl group together in the same molecule, and any type may be used. Specific examples thereof include citric acid and tartaric acid. One of these may be used alone, or two or more thereof may be mixed and used.

The lower limit of the amount of such a trifunctional or higher functional compound is, based on all constituent components constituting the aliphatic polyester-based resin (A), usually 0 mol % or more, preferably 0.01 mol % or more, and the upper limit is usually 5 mol % or less, preferably 2.5 mol % or less.

The aliphatic polyester-based resin (A) preferred in the present invention includes a polybutylene succinate-based resin and a polybutylene succinate adipate-based resin. In particular, the aliphatic polyester-based resin (A) is preferably polybutylene succinate, polybutylene succinate adipate, or a mixture thereof.

The raw material from which the aliphatic polyester-based resin (A), particularly the diol unit and/or dicarboxylic acid unit, is derived may be obtained using a biomass resource. The method for obtaining the raw material from a biomass resource is not particularly limited, and a known technique may be used.

The content of the cyclic dimer contained in the aliphatic polyester-based resin (A) as a raw material blended in the resin composition of the present invention is, by mass, indispensably from 1,000 to 10,000 ppm based on the aliphatic polyester-based resin (A) but preferably from 1,500 to 9,000 ppm, more preferably from 2,000 to 8,000 ppm, still more preferably from 2,500 to 7,500 ppm. If the content of the cyclic dimer derived from the aliphatic polyester-based resin (A) is excessively large, the amount added of the plasticizer (D) for starch, which is necessary for suppressing precipitation of the cyclic dimer, becomes too large and this may cause, for example, segregation of the plasticizer (D) for starch to the molded body surface or generation of a trouble at the molding due to excessively high fluidity of the resin. On the other hand, if the content of the cyclic dimer is kept smaller than necessary, as described later, the resin must be washed using an appropriate solvent or segregation of the cyclic dimer to the molded body surface may be certainly suppressed, but, for example, the process of washing with a solvent may be cumbersome or the solvent used for the washing may remain in the resin pellet. The cyclic dimer content cited in the present invention is a value quantitatively determined by the method described in Examples.

The method for controlling the cyclic dimer content to from 1,000 to 10,000 ppm by mass based on the entire aliphatic polyester-based resin (A) is not particularly limited but includes, for example, a method of devolatilizing the obtained resin while melting and extruding it by an extruder in the later-described production process of the aliphatic polyester-based resin (A), and a method of washing the aliphatic polyester-based resin (A) with an organic solvent after the production. However, the method of washing the aliphatic polyester-based resin (A) with an organic solvent after the production or the method of devolatilizing the obtained resin while melting and extruding it by an extruder is preferably not used for controlling the cyclic dimer content to less than 1,000 ppm, because there arises such a problem that the production process becomes cumbersome or the organic solvent used remain in the resin.

In the present invention, an aliphatic polyester-based resin (A) produced without using the method for controlling the cyclic dimer content to less than 1,000 ppm is preferably used. However, as long as the effects of the present invention are not impaired, the resin is not particularly limited thereto.

The cyclic dimer as referred to in the present invention indicates, when, for example, the diol component giving the diol unit of formula (1) is 1,4-butanediol and the dicarboxylic acid component giving the dicarboxylic acid unit of formula (2) is succinic acid, a structure represented by the following formula (3) consisting of two 1,4-butanediol units (BD) and two succinic acid (SA) units.

[Chem. 1]

(3)

The aliphatic polyester-based resin (A) for use in the present invention can be produced by a known method. For example, the resin may be produced by a general method for melt polymerization, comprising performing an esterification reaction and/or an transesterification reaction of the above-described aliphatic dicarboxylic acid component and aliphatic diol component and then performing a polycondensation reaction under reduced pressure, or a known solution heating dehydration condensation method using an organic solvent, but in view of profitability and simplicity of the production process, a method of producing the resin by melt polymerization performed in a solventless system is preferred.

The polycondensation reaction is preferably performed in the presence of a polymerization catalyst. The polymerization catalyst is not particularly limited in the timing of its addition as long as the catalyst is added before the polycondensation reaction and may be added when charging the raw materials or may be added at the start of pressure reduction. The polymerization catalyst is generally a compound containing a metal element of Groups 1 to 14 of the periodic table excluding hydrogen and carbon. Specific examples thereof include an organic group-containing compound such as carboxylate, alkoxy salt, organic sulfonate and β-diketonate complex each containing at least one more metal selected from the group consisting of titanium, zirconium, tin, antimony, cerium, germanium, zinc, cobalt, manganese, iron, aluminum, magnesium, calcium, strontium, sodium and potassium, and further include an inorganic compound such as oxide or halide of the above-described metal, and a mixture thereof.

Among these, a metal compound containing titanium, zirconium, germanium, zinc, aluminum, magnesium or calcium, and a mixture thereof are preferred, an a titanium compound and a germanium compound are more preferred. Also, a compound in the liquid form at the polymerization or a compound soluble in an ester polymer with a low degree of polymerization or a polyester is preferred, because when the catalyst is in the melted or dissolved state at the polymerization, the polymerization rate increases.

In the case of using a metal compound as the polymerization catalyst, the lower limit of the amount of the catalyst added is, in terms of the amount of metal based on the polyester produced, usually 5 ppm or more, preferably 10 ppm or more, and the upper limit is usually 30,000 ppm or less, preferably 1,000 ppm or less, more preferably 250 ppm or less, still more preferably 130 ppm or less. If the amount of the catalyst used is too large, this is not only profitably disadvantageous but also reduces the thermal stability of the polymer, whereas if it is excessively small, the polymerization activity decreases and in turn, decomposition of the polymer is liable to be induced during the polymer production.

The lower limit of the reaction temperature at the esterification reaction and/or transesterification reaction of the dicarboxylic acid component and the diol component is usually 150° C. or more, preferably 180° C. or more, and the upper limit is usually 260° C. or less, preferably 250° C. or less. The reaction atmosphere is usually an inert gas atmosphere such as nitrogen and argon. The reaction pressure is usually from atmospheric pressure to 10 kPa but is preferably atmospheric pressure. The reaction time is usually 1 hour or more, and the upper limit is usually 10 hours or less, preferably 4 hours or less.

The subsequent polycondensation reaction is preformed by setting the vacuum degree such that the lower limit of the pressure is $0.001 \times 10^3$ Pa or more, preferably $0.01 \times 10^3$ Pa or more, and the upper limit is usually $1.4 \times 10^3$ Pa or less, preferably $0.4 \times 10^3$ Pa or less. At this time, the lower limit of the reaction temperature is usually 150° C. or more, preferably 180° C. or more, and the upper limit is usually 260° C. or less, preferably 250° C. or less. The lower limit of the reaction time is usually 2 hours or more, and the upper limit is usually 15 hours or less, preferably 10 hours or less.

In the present invention, a known vertical or horizontal stirred tank reactor can be used as the reaction apparatus for producing the aliphatic polyester-based resin (A). For example, a method of performing melt polymerization in two stages, that is, an esterification reaction and/or transesterification step and a reduced-pressure polycondensation step, by using the same or different reaction apparatuses, and performing reduced-pressure polycondensation by using, as a reactor therefor, a stirred tank reactor equipped with a decompression exhaust tube connecting a vacuum pump and the reactor, may be employed. Also, a method of combining a condenser to the middle of the decompression exhaust tube connecting the vacuum pump and the reactor, and recovering a volatile component produced during the polycondensation reaction and an unreacted monomer, in the condenser is preferably employed.

In the present invention, the preferred range of the molar ratio between the diol component and the dicarboxylic acid component for obtaining a polyester having the intended polymerization degree varies depending on the purpose or the kind of raw material, but the lower limit of the amount of the diol component per mol of the acid component is usually 0.8 mol or more, preferably 0.9 mol or more, and the upper limit is usually 1.5 mol or less, preferably 1.3 mol or less, more preferably 1.2 mol or less. Also, a urethane bond, an amide bond, a carbonate bond, an ether bond or the like may be introduced.

The aliphatic polyester-based resin (A) for use in the present invention is a thermoplastic resin having crystallinity and has a melting temperature. The melting temperature of the aliphatic polyester-based resin (A) is preferably from 60 to 150° C., more preferably from 65 to 130° C., still more preferably from 70 to 120° C. If the melting temperature exceeds 150° C., the process temperature becomes high in the kneading step of the composition and therefore, deterioration of starch in the resin composition may proceed to cause a trouble such as coloration of the molded article, whereas if the melting temperature is less than 60° C., a problem such as deformation may occur in practical use depending on the temperature at which the molded article is used. The melting temperature is determined by differential scanning calorimeter measurement. The differential scanning calorimeter measurement is performed, for example, by using DSC7 manufactured by Perkin Elmer, heating 5 mg of the sample at a speed of 10° C./min in a nitrogen stream at a flow rate of 50 mL/min, and recording the endothermic peak resulting from crystal melting.

The aliphatic polyester-based resin (A) for use in the present invention has a sufficiently high crystallization speed, and the half-width of the exothermic peak based on crystallization when cooled at 10° C./min in the differential scanning calorimeter measurement is usually 15° C. or less, preferably 10° C. or less, more preferably 8° C. or less. The differential scanning calorimeter measurement is performed, for example, by using DSC7 manufactured by Perkin Elmer, heating/melting 5 mg of the sample in a nitrogen stream at a flow rate of 50 mL/min, cooling the sample at a speed of 10° C./min, and recording the exothermic peak resulting from crystallization.

The lower limit of the melt flow rate (MFR) of the aliphatic polyester-based resin (A) for use in the present invention is, when measured at 190° C. under 2.16 kg, usually 0.1 g/10 min or more, and the upper limit is usually 100 g/10 min or less, preferably 50 g/10 min or less, more preferably 30 g/10 min or less.

The content of the aliphatic polyester-based resin (A) in the resin composition of the present invention is, based on the entire resin composition (100%), in terms of percentage by mass, preferably 10% or more, more preferably 20% or more, still more preferably 30% or more, and the upper limit of the content is preferably 80% or less, more preferably 60% or less, still more preferably 50% or less, yet still more preferably 45% or less. If the content of the aliphatic polyester-based resin (A) is too large, this disadvantageously incurs, for example, deterioration of the physical properties such as tearing strength or rise in the cost, whereas if the content of the aliphatic polyester-based resin (A) is excessively small, the physical properties such as tensile elastic modulus or the film formability may be impaired and this is not preferred.

<Thermoplastic Resin (B) Other than Aliphatic Polyester-Based Resin (A)>

The resin composition of the present invention may contain (B) a thermoplastic resin other than the aliphatic polyester-based resin (A), together with the aliphatic polyester-based resin (A) and the starch (C).

The thermoplastic resin (B) for use in the present invention is not particularly limited as long as it is a thermoplastic resin other than the aliphatic polyester-based resin (A), but is preferably a biodegradable resin. Specific examples thereof include a polybutylene succinate-based resin, a polybutylene succinate adipate-based resin, a polylactic acid, a polyhydroxy alkanoate, a polycaprolactone, and an aliphatic-aromatic polyester-based resin. Among these, an aliphatic-aromatic polyester-based resin is preferred in view of compatibility with the aliphatic polyester-based resin (A). The aliphatic-aromatic polyester-based resin when contained in the resin composition forms a dispersed phase, similarly to the starch (C).

The "aliphatic-aromatic polyester-based resin" is mainly composed of an aromatic dicarboxylic acid, an aliphatic dicarboxylic acid and an aliphatic diol. In this case, the content of the aromatic dicarboxylic acid unit is preferably from 5 to 60 mol % based on the entire amount (100 mol %) of the aliphatic dicarboxylic acid unit and the aromatic dicarboxylic acid unit. Specifically, this resin contains an aliphatic diol unit represented by the following formula (4), an aliphatic dicarboxylic acid unit represented by the following formula (5), and an aromatic dicarboxylic acid unit represented by the following formula (6), as essential components, and may contain an oxycarboxylic acid unit.

$$—O—R^3—O— \quad (4)$$

[In formula (4), $R^3$ represents a divalent chain aliphatic hydrocarbon group and/or a divalent alicyclic hydrocarbon group, and when copolymerized, the kind thereof is not limited to one kind.]

$$—OC—R^4—CO— \quad (5)$$

[In formula (5), $R^4$ represents a direct bond or a divalent chain aliphatic hydrocarbon group and/or a divalent alicyclic hydrocarbon group, and when copolymerized, the kind thereof is not limited to one kind.]

$$—OC—R^5—CO— \quad (6)$$

[In formula (6), $R^5$ represents a divalent aromatic hydrocarbon group, and when copolymerized, the kind thereof is not limited to one kind.]

The diol component giving the diol unit of formula (4) is usually a diol having a carbon number of 2 to 10, and examples thereof include ethylene glycol, 1,3-propanediol, 1,4-butanediol and 1,4-cyclohexanedimethanol. Among these, a diol having a carbon number of 2 to 4 is preferred, ethylene glycol and 1,4-butanediol are more preferred, and 1,4-butanediol is still more preferred.

The dicarboxylic acid component giving the dicarboxylic acid unit of formula (5) is usually a dicarboxylic acid having a carbon number of 2 to 10. Examples thereof include succinic acid, adipic acid, suberic acid, sebacic acid and dodecanedioic acid, with succinic acid and adipic acid being preferred.

Examples of the aromatic dicarboxylic acid giving the aromatic dicarboxylic acid unit of formula (6) include terephthalic acid, isophthalic acid and naphthalenedicarboxylic acid. Among these, terephthalic acid and isophthalic acid are preferred, and terephthalic acid is more preferred. Other examples include an aromatic dicarboxylic acid in which a part of the aromatic ring is substituted with a sulfonate. Two or more kinds of aliphatic dicarboxylic acid components, two or more kinds of aliphatic diol components, and two or more kinds of aromatic dicarboxylic acid components may be used. The aliphatic-aromatic polyester-based resin is preferably a polybutylene terephthalate alkylate-based resin, more preferably a polybutylene adipate terephthalate-based resin or a polybutylene succinate terephthalate-based resin, still more preferably a polybutylene adipate terephthalate-based resin.

The aliphatic-aromatic polyester-based resin for use in the present invention may contain an aliphatic oxycarboxylic acid unit. Specific examples of the aliphatic oxycarboxylic acid giving the aliphatic oxycarboxylic acid unit include lactic acid, glycolic acid, 2-hydroxy-n-butyric acid, 2-hydroxycaproic acid, 6-hydroxycaproic acid, 2-hydroxy-3,3-dimethylbutyric acid, 2-hydroxy-3-methylbutyric acid, 2-hydroxyisocaproic acid, and a mixture thereof. A lower alkyl ester or intramolecular ester thereof may also be used. In the case of having an optical isomer, the optical isomer may be any of D-form, L-form and racemic form, and the morphology may be any of a solid, a liquid and an aqueous solution. Above all, lactic acid and glycolic acid are preferred. One of these aliphatic oxycarboxylic acids may be used alone, or a mixture of two or more thereof may be used.

The lower limit of the amount of this aliphatic oxycarboxylic acid is, based on all constituent components constituting the aliphatic-aromatic polyester-based resin, usually 0 mol % or more, preferably 0.01 mol % or more, and the upper limit is usually 30 mol % or less, preferably 20 mol % or less.

The aliphatic-aromatic polyester-based resin can be produced by the same production method as that for the aliphatic polyester-based (A).

The lower limit of the melt flow rate (MFR) of the aliphatic-aromatic polyester-based resin for use in the present invention is, when measured at 190° C. under 2.16 kg, usually 0.1 g/10 min or more, and the upper limit is usually 100 g/10 min or less, preferably 50 g/10 min or less, more preferably 30 g/10 min or less.

The content of the thermoplastic resin (B) other than the aliphatic polyester-based resin (A) is preferably from 1 to 100 parts by mass per 100 parts by mass of the aliphatic polyester-based resin (A). The lower limit of the content is more preferably 5 parts by mass or more, still more preferably 10 parts by mass or more, and most preferably 20 parts by mass or more. The upper limit of the content is more preferably 70 parts by mass or less, still more preferably 60 parts by mass or less. If the content of the thermoplastic resin (B) is too large, poor dispersion of the starch (C) in the resin composition may result in the later-described kneading step and this may bring about reduction in the mechanical properties or the like of the molded body such as film obtained by molding the resin composition, whereas if the content of the thermoplastic resin (B) is excessively small, this may also give rise to poor dispersion of the starch (C) in the resin composition in the later-described kneading step.

The content of the thermoplastic resin (B) other than the aliphatic polyester-based resin (A) in the resin composition of the present invention is, based on the entire resin composition (100%), in terms of percentage by mass, preferably from 15 to 25%. If the content of the thermoplastic resin (B) other than the aliphatic polyester-based resin (A) is too large, the film obtained from the resin composition lacks elasticity and the biodegradation speed disadvantageously decreases, whereas if the content of the thermoplastic resin (B) other than the aliphatic polyester-based resin (A) is excessively small, poor dispersion of the starch (C) may result or the tensile elastic modulus or tearing strength may be lacking and this is not preferred.

<Starch (C)>

The starch (C) for use in the present invention is a carbohydrate (polysaccharide) represented by a molecular formula $(C_6H_{10}O_5)_n$ [wherein n represents a positive integer] and this is a natural polymer resulting from polymerization of a large number of α-glucose molecules through a glycoside bond, or a modification product thereof. The term "modification" as used herein includes all modifications such as chemical, physical and biological modifications. The chemical modification indicates partially or entirely modifying the constituent units of the starch (C) by a chemical reaction such as esterification, etherification, oxidation, reduction, coupling, dehydration, hydrolysis, dehydrogenation and halogenation, and particularly indicates esterifying or etherifying the hydroxyl group. The physical modification indicates changing the physical property, for example, changing the crystallization degree. The biological modification indicates changing the chemical structure or the like by using a living substance.

Specific examples of the starch (C) for use in the present invention include corn starch, waxy corn starch, high amylose starch, wheat starch, rice starch, potato starch, sweet potato starch, tapioca starch, pea starch and a starch. Corn starch and potato starch are preferred, and corn starch is more preferred.

As for the starch (C) used in the present invention, in view of enhancing physical properties such as tearing strength and tensile elastic modulus, a starch capable of forming a starch dispersed phase having an average particle diameter of 1 μm or less in the resin composition is preferably used, and the average particle diameter of the starch dispersed phase is more preferably 0.7 μm or less, still more preferably 0.5 μm or less. The "average particle diameter of the starch" as used herein an average value of equivalent-circle diameters (a diameter when the area of a starch phase is measured and a true circle having the area is drawn), and the measuring method thereof is separately described in detail.

The content of the starch (C) may be arbitrarily selected as long as the effects of the present invention are not seriously impaired, but the content is preferably from 1 to 60 mass % based on the entire resin composition (100 mass %). The lower limit of the starch content is more preferably 5 mass %, still more preferably 10 mass %, yet still more preferably 15 mass %, and most preferably 30 mass %. The upper limit of the starch content is more preferably 50 mass %, still more preferably 45 mass %, and most preferably 40 mass %. If the starch content is less than 1 mass %, the effect of improving the physical properties by the starch may not be sufficiently brought out, whereas if the starch content exceeds 60 mass %, water resistance, hydrolysis resistance, flexibility an the like may be impaired.

<Plasticizer (D) for Starch>

The resin composition of the present invention preferably contains (D) a plasticizer for starch. As the plasticizer (D) for starch, an organic compound containing a hydroxyl group is suitably used. The organic compound containing a hydroxyl group is not particularly limited as long as it has a hydroxyl group, but specific examples thereof include a monohydric alcohol, a polyhydric alcohol, and a partial ester or partial ether of polyhydric alcohol. Among these, preferred are sorbitol, pentaerythritol, trimethylolpropane, trimethylolethane, ethylene glycol, propylene glycol, 1,3-propanediol, 1,4-butanediol, 1,5-heptanediol, 1,6-hexanediol, 1,8-octanediol, 1,9-nonanediol, 1,10-decanediol, 1,12-dodecanediol, diethylene glycol, triethylene glycol, polyethylene glycol, dipropylene glycol, tripropylene glycol, polypropylene glycol, glycerin, glycerin monoalkyl ester, glycerin dialkyl ester, glycerin monoalkyl ether, glycerin dialkyl ether, diglycerin, and diglycerin alkyl ester; more preferred are ethylene glycol, diethylene glycol, propylene glycol, dipropylene glycol, glycerin, glycerin monoester, sorbitol and pentaerythritol; still more preferred are glycerin, sorbitol, pentaerythritol, propylene glycol and ethylene glycol; and most preferred is glycerin. One kind or two or more kinds of plasticizers (D) for starch are used.

The molecular weight of the plasticizer (D) for starch is preferably 3,000 or less, more preferably 2,500 or less, still more preferably 2,000 or less.

The content of the plasticizer (D) for starch is preferably from 10 to 55 mass % based on the starch (C) (100 mass %). The upper limit of the content of the plasticizer (D) for starch is more preferably 50 mass %, still more preferably 45 mass %, and the lower limit of the content is more preferably 15 mass %, still more preferably 17 mass %, yet still more preferably 20 mass %. If the content of the plasticizer (D) for starch is too small, an oligomer derived from the aliphatic polyester-based resin (A) may precipitate on the surface or plasticization of the starch added may not sufficiently proceed to cause poor dispersion of the starch in the aliphatic polyester and in turn, deterioration of mechanical properties, whereas if the content of the plasticizer (D) for starch is excessively large, the plasticizer (D) for starch may segregate to the molded body surface and impair the property such as surface appearance.

Particularly, in the present invention, it is preferred to contain (C) a starch and (D) a plasticizer for starch together with the aliphatic polyester-based resin (A) and set the content of the plasticizer (D) for starch to the range described above based on the starch (C). As described above, when the plasticizer (D) for starch is blended in a specific amount, this produces an effect that the plasticizer (D) for starch permeates the inside of the starch (C) and upon heating, the starch is thermally plasticized and thereby increased in the compatibility with the aliphatic polyester-based resin (A) and the thermoplastic resin (B) other than the aliphatic polyester-based resin (A), making the dispersion diameter of the starch phase small, as a result, mechanical properties of the resin composition are improved, and at the same time, further produces a surprising effect that a cyclic dimer derived from the aliphatic polyester-based resin (A) dissolves in the plasticizer (D) for starch and precipitation of a cyclic dimer to the surface of a resin composition pellet or molded body is suppressed.

Accordingly, even when the cyclic dimer content in the aliphatic polyester-based resin (A) is 1,000 ppm or more, surface precipitation of a cyclic dimer can be suppressed.

In the resin composition of the present invention, the lower limit of the content of the plasticizer (D) for starch is, based on the entire resin composition (100%), in terms of percentage by mass, preferably 1% or more, more preferably 3% or more, still more preferably 4% or more, and the upper limit is preferably 10% or less, more preferably 8% or less, still more preferably 7% or less. If the content of the plasticizer (D) for starch is too large, the plasticizer (D) for starch may bleed out from the film surface or the elastic modulus of the obtained film may decrease and this is not preferred, whereas if the content of the plasticizer (D) for starch is excessively small, the starch cannot be sufficiently plasticized, and the starch dispersion disadvantageously comes to have a coarse particle diameter.

<Various Additives>

In the present invention, "other components" such as compatibilizer, inorganic filler, organic filler, crystal nucleating agent, antioxidant, antiblocking agent, ultraviolet absorber, light protective agent, oxidation inhibitor, thermal stabilizer, coloring agent, flame retardant, release agent, antistatic agent, antifog agent, surface wetting improver, incineration aid, pigment, lubricant, dispersion aid, surfactant, slipping agent, hydrolysis inhibitor and end capping agent, may be used. These may be optionally used within the range not impairing the above-described effects.

(Compatibilizer)

The resin composition of the present invention may contain a compatibilizer. The compatibilizer is an additive for improving the compatibility when mixing immiscible different resins or mixing a starch and a resin. The compatibility can be enhanced by adding a compatibilizer.

The compatibilizer is preferably added in an amount of 0.01 to 10 mass % based on the entire resin composition (100 mass %). The lower limit of the amount added is more preferably 0.1 mass % or more, still more preferably 1 mass % or more, and the upper limit of the amount added is more preferably 5 mass % or less, still more preferably 3 mass % or less, yet still more preferably 2 mass % or less.

Examples of the compatibilizer include a polymer-type compatibilizer, a low molecular organic compound, an inorganic compound and an inorganic-organic composite, but a polymer-type compatibilizer and a low molecular organic compound are preferred in view of physical properties of the molded particle, and a polymer-type compatibilizer is more preferred in view of molding process. Also, a compatibilizer having any structure of an acid anhydride group, a glycidyl group and an ether group is preferred, and a polymer-type compatibilizer having any of such structures is more preferred. The effect of enhancing the compatibility is increased by using a compatibilizer having such a structure.

The polymer-type compatibilizer includes a resin such as polyester type, polyolefin type, polyamide type, polyether type, polycarbonate type, acryl type, styrene type, urethane type, polyacetal type, olefin-based elastomer, unsaturated aliphatic elastomer and hydrogenated unsaturated aliphatic elastomer, and a block, graft or random copolymer of two or more kinds of these resins. A polar group may be introduced into a molecular by, for example, further adding an unsaturated fatty acid anhydride to such a copolymer. The unsaturated fatty acid anhydride added is preferably maleic anhydride.

Among these, a polyester type, a polyolefin type, a polyamide type, a polyether type, an acryl type, a styrene type, an olefin-based elastomer, an unsaturated aliphatic elastomer, a hydrogenated unsaturated aliphatic elastomer, a copolymer of two or more thereof, and the like are preferred, and a polyolefin type, a polyamide type, a polyether type, an acryl type, a styrene type, a hydrogenated unsaturated aliphatic elastomer, and a copolymer of two or more thereof are more preferred.

The compatibilizer of polyester type includes an aromatic polyester such as polyethylene terephthalate and polybutylene terephthalate, and a polyester block, random or graft copolymer containing, in a part of the molecular structure, a structure such as polylactic acid, polycaprolactone and poly-3-hydroxybutylate.

Examples of the compatibilizer of polyamide type include nylon 6, nylon 6,6 and nylon 12. Examples of the compatibilizer of polyether type include polyethylene glycol, polypropylene glycol and polytetramethylene glycol.

Examples of the styrene type include polystyrene, poly-p-methylstyrene and poly-α-methylstyrene. Examples of the olefin-type elastomer include an ethylene propylene random copolymer and a poly-1-butene. Examples of the unsaturated aliphatic elastomer include polybutadiene, polyisoprene, SBS and SIS. Examples of the hydrogenated unsaturated aliphatic elastomer include SEBS and SEPS. Among these polyolefin type, polyamide type, polyether type, acryl type, styrene type and hydrogenated unsaturated aliphatic elastomer and a copolymer of two or more thereof, particularly preferred examples include a polyolefin/glycidyl acrylate copolymer, a polyolefin/glycidyl methacrylate copolymer, a polyolefin/polyether copolymer, a polyether ester amide, SEBS, and maleic anhydride-modified SEBS.

(Inorganic Filler)

In the resin composition of the present invention, an inorganic filler may be blended. Examples of the inorganic filler include silica, mica, talc, titanium oxide, calcium carbonate, diatomaceous earth, allophane, bentonite, potassium titanate, zeolite, sepiolite, smectite, kaolin, kaolinite, glass, limestone, carbon, wollastonite, calcined pearlite, silicates such as calcium silicate and sodium silicate, aluminum oxide, magnesium carbonate, hydroxides such as calcium hydroxide, ferric carbonate, zinc oxide, iron oxide, aluminum phosphate, and barium sulfate. One of these may be used alone, or two or more thereof may be mixed and used.

The amount of the inorganic filler contained in the resin composition of the present invention is not particularly limited, but the content of the inorganic filler is preferably from 1 to 30 parts by mass, more preferably from 3 to 20 parts by mass, still more preferably from 5 to 15 parts by mass, per 100 parts by mass of the resin composition. If the content of the inorganic filler is too small, the effect of improving the mechanical properties may decrease, whereas if it is excessively large, the moldability and impact resistance may be impaired.

(Organic Filler)

Examples of the organic filler include pulp, chitin and/or chitosan, coconut shell flour, bamboo powder, bark powder, kenaf powder and straw powder. One of these may be used alone, or two or more thereof may be mixed and used. The content of the organic filler in the resin composition is preferably 60 parts by mass or less per 100 parts by mass of the resin composition.

One kind of these various additives may be used alone, or two or more kinds thereof may be mixed and used. Out of these additives, a slipping agent and an antiblocking agent are preferably blended.

As for the antifog agent, the antifog agent may previously kneaded with the resin or may be coated on the molded article surface after molding. Specifically, the antifog agent used is preferably a surfactant containing an ester of a saturated or unsaturated aliphatic carboxylic acid having a carbon number of 4 to 20 and a polyhydric alcohol. The slipping agent includes an unsaturated fatty acid amide and an unsaturated bisamide each comprising an unsaturated fatty acid having a carbon number of 6 to 30, and an erucic acid amide is most preferred.

Examples of the antiblocking agent include a saturated fatty acid amide having a carbon number of 6 to 30, a saturated fatty acid bisamide, methylolamide, ethanolamide, natural silica, synthetic silica, synthetic zeolite and talc.

The light protective agent is specifically, preferably bis(1, 2,2,6,6-pentamethyl-4-piperidyl)sebacate or 2-(3,5-di-tert-butyl-4-hydroxybenzyl)-2-n-butyl-bis(1,2,2,6,6-pentamethyl-4-piperidyl)malonate.

As for the ultraviolet absorber which may be added to the resin composition of the present invention, an antioxidant of benzophenone type, benzotriazole type, salicylic acid type, cyanoacrylate type or the like is suitably used.

The amount added of such an additive is usually from 0.001 to 10 mass % based on the entire resin composition (100 mass %). The lower limit of the amount added is preferably 0.01 mass % or more, more preferably 0.1 mass % or more, and the upper limit of the amount added is preferably 5 mass % or less, more preferably 3 mass % or less. In the resin composition of the present invention, a freshness-keeping agent, an antimicrobial and the like may also be blended as a functional additive.

Examples of the end capping agent include a carbodiimide compound, an epoxy compound and an oxazoline compound. Among these, a carbodiimide compound is suitably used.

(Carbodiimide Compound)

In the present invention, a carbodiimide compound may be suitably used not only for suppressing hydrolysis due to moisture or the like mainly in the atmosphere but also for enhancing the moldability and furthermore, decreasing the cyclic dimer. The carbodiimide compound used is a compound having one or more carbodiimide group in the molecule (including a polycarbodiimide compound), and such a carbodiimide compound can be synthesized by using an organic phosphorus-based compound or an organic metal compound as the catalyst and causing an isocyanate compound to undergo a decarboxylation condensation reaction in a solventless system or in an inactive solvent at a temperature of 70° C. or more.

Out of the carbodiimide compounds, examples of the monocarbodiimide compound include dicyclohexylcarbodiimide, diisopropylcarbodiimide, dimethylcarbodiimide, diisobutylcarbodiimide, dioctylcarbodiimide, tert-butylisopropylcarbodiimide, diphenylcarbodiimide, di-tert-butylcarbodiimide, and di-β-naphthylcarbodiimide. Among these, dicyclohexylcarbodiimide and diisopropylcarbodiimide are preferred because of their industrial availability. As for the polycarbodiimide compound, those produced by the methods described, for example, in U.S. Pat. No. 2,941,956, JP-B-47-33279, *J. Org. Chem.*, Vol. 28, pp. 2069-2075 (1963), and *Chemical Review* 1981, Vol. 81, No. 4, pp. 619-621, may be used.

In the present invention, a polycarbodiimide compound may also be used. The lower limit of its polymerization degree is 2 or more, preferably 4 or more, and the upper limit is usually 40 or less, preferably 20 or less. If the polymerization is too large, dispersibility in the composition becomes insufficient, and this may give rise to, for example, a poor appearance in an inflation film.

The carbodiimide compound may be added at the later-described preparation of the resin composition or may be mixed with all components of the resin composition before molding by kneading it with one or two kinds of polyesters out of the aliphatic polyester-based resin and the aliphatic-aromatic polyester-based resin and dry-blending the mixture with other components at the molding. Alternatively, a master batch with a high carbodiimide compound concentration may be prepared using the aliphatic polyester-based resin and/or the aliphatic-aromatic polyester-based resin, and the aliphatic polyester-based resin and/or the aliphatic-aromatic polyester-based resin and the starch may be dry-blended for dilution to give a predetermined carbodiimide compound concentration at the molding.

<Other Components>

In the resin composition of the present invention, a biodegradable resin and a natural product, for example, polylactic acid, polycaprolactone, polyamide, polyvinyl alcohol, celluloses such as cellulose ester, animal/plant substance fine powders such as paper, wood powder, chitin and/or chitosan, coconut shell flour and walnut shell flour, or a mixture thereof, may be blended.

<Production Process and Molding Method of Resin Composition>

(Production Process of Resin Composition (Kneading))

The aliphatic polyester-based resin (A), the starch (C), which are the above-described raw materials, the thermoplastic resin (B) other than the aliphatic polyester-based resin (A), the plasticizer (D) for starch and the like, which are optional components, are melt-kneaded, whereby the resin composition of the present invention is produced. In the production of the resin composition of the present invention, in view of dispersibility of the resin, the aliphatic polyester-based resin (A) is preferably added separately after other components are melt-mixed. That is, it is preferred that the starch (C) is previously melt-mixed with the thermoplastic resin (B) other than the aliphatic polyester-based resin (A), the plasticizer (D) for starch and the like, which are added, if desired, to obtain a composition (X) and thereafter, the aliphatic polyester-based resin (A) is added thereto and further melt-mixed.

In producing the resin composition, all of conventionally known mixing/kneading techniques can be applied. Examples of the mixer which can be include a mixer of horizontal cylindrical type, V-shaped type or double conical type, a blender such as ribbon blender and super mixer, and various continuous mixers. Examples of the kneader which can be used include a batch kneader such as roll or internal mixer, a one-stage or two-stage continuous kneader, a twin-screw extruder and a single-screw extruder. In the present invention, in view of kneading efficiency, a twin-screw extruder is preferably used, and an extruder where the screws rotate in the same direction is preferred.

FIG. 1 is a schematic view of the twin-screw extruder 100 which is preferably used for the production of the resin composition of the present invention. The twin-screw extruder 100 comprises two screw shafts 2 being horizontally disposed in parallel in a cylinder 1 and engaging each other. The cylinder 1 comprises a main raw material feed part 3 locating on the upstream side in the delivering direction and an auxiliary raw material feed part 5 locating on the downstream side in the delivering direction, and vent parts 4 and 6 are provided on the upstream side and the downstream side, respectively, of the auxiliary raw material feed part 5.

The starch (C), the thermoplastic resin (B) other than the aliphatic polyester-based resin (A), and the plasticizer (D) for starch are fed from the main raw material feed part 3 and melt-kneaded to form a composition (X), and the composition is fed to the downstream direction of the cylinder. The temperature at the melt-kneading must be higher than at least the melting points of the plasticized starch and the resin and is usually from 100 to 180° C., preferably from 130 to 170° C. The gas components such as air, water vapor or raw material-derived volatile component included in the melted composition (X) are partially discharged through the vent part 4 which is an open vent and is present between the main raw material feed part 3 and the auxiliary raw material feed part 5, and separated to effect devolatilation.

The devolatilized composition (X) is further melt-kneaded with the aliphatic polyester-based resin (A) side-fed from the auxiliary raw material feed part 5 to produce a resin composition. The gas components such as air, water vapor or raw material-derived volatile component included in the resin composition are partially vacuum-suctioned through the vent part 6 which is a suction vent, and discharged to the outside.

The resin composition in the melted state after passing through the vent part 6 is extruded in a melted strand form from a die head 7 into water, thereby being cooled and solidified, then cut by a pelletizer (not shown) and dried, whereby a resin composition pellet is obtained. In the mode shown, the resin composition devolatilized by the twin-screw extruder 100 is once pelletized through the die head 7 and the pelletizer, but the resin composition in the melted state may be directly fed to a molding machine and formed into a film or the like.

Figure 3:
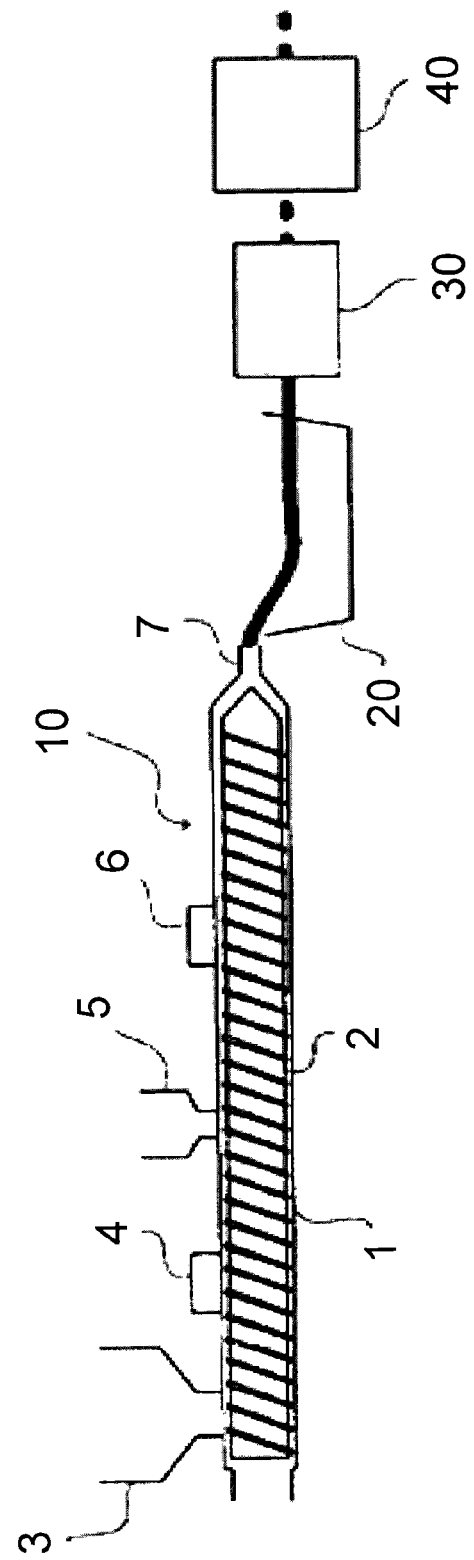
FIG. 3 is a schematic view illustrating the production process of a resin composition pellet.

FIG. 3 is a schematic view of the process of producing the resin pellet. The twin-screw extruder 10 is the same as the above-described extruder 100. The resin composition in the melted state after passing through a vent part 6 is extruded in a melted strand form from a die head 7 into water in a water tank 20, thereby being cooled and solidified, then cut by a pelletizer 30 and dried in a drier 40 to obtain a resin composition pellet.

The obtained resin composition pellet is fed to the molding machine for the forming into a film. In the present invention, when feeding the resin composition to the molding machine, the water amount thereof is preferably adjusted to less than 1 mass %. That is, the film of the present invention is produced using a resin composition having a water amount of less than 1 mass %. By adjusting the water amount to the range above, the moldability of the resin composition is improved and in turn, a film with good physical properties such as tensile elastic modulus and tearing strength can be obtained.

For adjusting the water amount to the above-described range, it is necessary to remove water from the resin composition in the vent parts 4 and 6 at the production of the resin composition and thoroughly dry the resin composition pellet in the drier. The pelletized resin composition is preferably dried in the drier at 60 to 80° C. for at least 8 hours or more. Also, the drying is preferably performed in a nitrogen atmosphere for keeping the quality of the pellet. Here, the water amount of the resin pellet is a value measured by the Karl Fischer method.

In the mode shown, the resin composition is once pelletized through the die head 7 and the pelletizer 30, but if it can be confirmed that the water is removed in the vent parts 4 and 6 to not more than the water amount specified in the present invention, the resin composition in the melted state may be directly fed to the molding machine and formed into a biodegradable film.

In the present invention, the kneading method preferably contains a devolatilization step. Specifically, it is preferred to attach a vent part, preferably a vacuum vent. By attaching a vacuum vent, the excess water and/or cyclic dimer in the resin composition can be reduced.

The volatilization step by a vacuum vent is performed, for example, by vacuuming using a vacuum pump. The degree of vacuum in the vacuum vent is not particularly specified but is preferably 200 Torr or less.

The method for preparing the resin composition of the present invention is not particularly limited, but examples of the method include:

(1) a method where all raw materials are blended and the blend is charged into a hopper of an extruder and melt-mixed in the extruder;

(2) a method where the aliphatic polyester resin (A), the starch (C) and the plasticizer (D) for starch are blended, the blend is charged into a hopper of an extruder and melt-mixed in the extruder, and the obtained resin composition is dry-blended with the thermoplastic resin (B) other than the aliphatic polyester resin (A);

(3) a method where the thermoplastic resin (B) other than the aliphatic polyester resin, the starch (C) and the plasticizer (D) for starch are blended, the blend is charged into a hopper of an extruder and melt-mixed in the extruder, and the obtained resin composition is dry-blended with the aliphatic polyester resin (A);

(4) a method where the step of mixing the starch (C) and the plasticizer (D) for starch, the step of subsequently feeding the aliphatic polyester resin (A) and the thermoplastic resin (B) other than the aliphatic polyester resin (A) to an extruder by using a feeding device, preferably a side feeder or the like, and the step of thereafter melt-mixing respective raw materials are performed in the same extrude to effect melt-mixing; and (5) a method where the step of mixing the thermoplastic resin (B) other than the aliphatic polyester resin (A), the starch (C) and the plasticizer (D) for starch, the step of subsequently feeding the aliphatic polyester resin (A) to an extruder by using a feeding device, preferably a side feeder or the like, and the step of thereafter melt-mixing respective raw materials are performed in the same extrude to effect melt-mixing.

Above all, in view of, for example, load on the extruder, dispersibility of the starch (C) in the resin composition and productivity of the resin composition in the kneading process, the resin composition is preferably prepared by the method of (5).

Also, the resin composition prepared by the method above may be mixed with the aliphatic polyester resin (A) and the thermoplastic resin (B) other than the aliphatic polyester resin to adjust its composition to the desired resin composition.

Of course, it is also possible to prepare the resin composition by feeding respective raw materials directly to the molding machine and at the same time, obtain a molded body of the resin composition. Examples of this method include a method of mixing respective components, heat-melting the mixture, adding thereto various additives, an inorganic filler, an organic filler, the above-described "other components", other polyesters and the like, and blending these. At this time, a blending oil or the like may also be used so as to uniformly disperse those various additives.

(Sea-Island Structure in Resin Composition)

The obtained resin composition is a resin composition having a sea-island structure where the aliphatic polyester resin (A) forms a matrix phase and the starch (C) and the aliphatic-aromatic polyester-based resin (in the case of adding an aliphatic-aromatic polyester-based resin) each forms dispersed dispersed phases. The average particle diameter of respective dispersed phases is 1 μm or less, preferably 0.5 μm or less, more preferably 0.3 μm or less. In this way, by adding only the aliphatic polyester resin (A) later, dispersibility of respective components in the resin composition can be enhanced and in turn, a resin composition with good moldability and mechanical properties can be obtained. The dispersibility of each component in the resin composition can be improved, for example, by controlling the blending amount of the thermoplastic resin (B) other than the aliphatic polyester-based resin (A), which is added as needed; by controlling the blending amount of the plasticizer (D) for starch; by melt-mixing the starch (C) with the thermoplastic resin (B) other than the aliphatic polyester-based resin (A), the plasticizer (D) for starch, and the like, which are added as needed to obtain a composition (X) containing a starch (C) having an average particle diameter of 1 μm, adding the aliphatic polyester-based resin (A) thereto and further melt-mixing these; or by applying an appropriate combination of these conditions. Incidentally, the average particle diameter of the dispersed phase of each component in the resin can be determined as follows: the resin composition is subjected to ion etching and subsequently to gold deposition and observed using a transmission electron microscope (TEM), and an average value of equivalent-circle diameters of dispersed phases of each component present in the range of 5 μm×5 μm of the TEM image is calculated. The measurement of the average particle diameter may be fundamentally sufficient if it is performed for one arbitrarily extracted resin composition pellet, but in the case where the numerical value greatly fluctuates among pellets, an average value of 100 randomly sampled pellets may be employed.

(Cyclic Dimer in Resin Composition)

In the present invention, the content of the cyclic dimer derived from the aliphatic polyester-based resin (A) present in the entire resin composition (in the present invention, this dimer is sometimes simply referred to as a cyclic dimer), which is obtained by analyzing the resin composition, is preferably, by mass, from 1,000 to 9,000 ppm, more preferably from 1,000 to 7,500 ppm, still more preferably from 1,000 to 6,000 ppm, yet still more preferably from 1,000 to 4,500 ppm. If the content of the cyclic dimer is too large, the amount added of the plasticizer (D) for starch, which is necessary for suppressing precipitation of the cyclic dimer, becomes too large and this may cause, for example, segregation of the plasticizer (D) for starch to the molded body surface or deterioration of the molding processability due to excessively high fluidity of the resin. On the other hand, if the content of the cyclic dimer is kept smaller than necessary, the resin composition must be washed using an appropriate solvent. As a result, segregation of the cyclic dimer to the molded body surface may be certainly suppressed, but, for example, the process of washing with a solvent may be cumbersome or the solvent used for the washing may remain in the resin composition pellet.

The cyclic dimer content in the resin composition, as cited in the present invention, is a value quantitatively determined by the method described in Examples.

In the present invention, the content of the cyclic dimer present in the molded body is almost the same as the content of the cyclic dimer contained in the resin composition before molding. That is, at the molding, the cyclic dimer contained in the resin composition is contained in the obtained molded body without undergoing volatilization and the like. However, when the cyclic dimer is precipitated on the molded body surface, the mass of the cyclic dimer precipitated is included in the content of the cyclic dimer present in the molded body. In the present invention, the cyclic dimer content in the molded body is a value quantitatively determined by the method described in Examples.

(Molding Method of Resin Composition)

The resin composition of the present invention may be molded by various molding methods applied to general-purpose plastics. Examples of the molding method include compression molding (compression molding, lamination molding, stampable molding), injection molding, extrusion or co-extrusion molding (film forming, laminate forming, pipe forming, wire/cable forming or shape forming by an inflation method or a T-die method), hollow molding (blow molding of every types), calender molding, foam molding (melt foam molding, solid-phase foam molding), solid forming (uniaxial stretching forming, biaxial stretching forming, rolling molding, stretched oriented nonwoven fabric forming, thermoforming (vacuum forming, compressed air forming), plastic forming), powder molding (rotation molding), and nonwoven fabric forming of various types (e.g., dry method, adhesion method, entangling method, spunbond method). Among these, extrusion molding, injection molding, foam molding and hollow molding are suitably applied. As for the specific shape, applications to a film, a container and a fiber are preferred. The resin composition of the present invention has good melting characteristics and mechanical properties and therefore, is preferably used for a film formed by inflation molding and further for a product produced using a film formed by inflation molding.

<Physical Properties of Molded Body>

In the case of molding the resin composition into a film of 20 vim in thickness, the tensile elastic modulus of the molded body in the direction parallel to the resin flow is preferably from 50 to 700 MPa, more preferably from 80 to 650 MPa, still more preferably from 100 to 600 MPa, yet still more preferably from 150 to 500 MPa, though the present invention is not particularly limited thereto. If the tensile elastic modulus is too low, depending on the thickness, the film may be unable to withstand the weight of contents when used as a packaging material such as garbage bag, supermarket bag, shopping bag and compost bag, whereas if it is excessively high, the film may be deteriorated in the flexibility and become clumsy to use. For this reason, the tensile elastic modulus in accordance with JIS K7127 is in particular preferably 200 MPa or more.

In the case of molding the resin composition into a film of 20 μm in thickness, the Elmendorf tearing strength in the direction parallel to the resin flow is preferably 2 N/mm or more, more preferably 4 N/mm or more, still more preferably 6 N/mm or more, and most preferably 8 N/mm, though the present invention is not particularly limited thereto. If the Elmendorf tearing strength is less than 2 N/mm, there may arise a problem in practical use as a packaging material such as garbage bag, supermarket bag, shopping bag and compost bag. For this reason, the Elmendorf tearing strength in accordance with JIS K7128 is particularly preferably 100 N/mm or more.

The film composed of the resin composition produced by the production process of the present invention preferably exhibits a weight decrease of 5% or more in 8 days in a horticultural soil under an environment of 50° C., and the weight decrease ratio is more preferably 8% or more and most preferably 10% or more. If the weight decrease ratio is less than 5% in 8 days, when disposed of, the film may remain in the ground for a long period of time, and if the weight decrease ratio at the initial stage is low, the film may not completely biodegraded.

Also, such a molded article may be subjected to purposeful secondary processing of various type for the purpose of imparting, for example, a chemical function, an electrical function, a magnetic function, a mechanical function, a friction/abrasion/lubrication function, an optical function, a thermal function and a surface function such as biocompatibility. Examples of the secondary processing include embossing, painting, adhesion, printing, metalizing (e.g., plating), mechanical processing, and surface treatment (e.g., antistatic treatment, corona discharge treatment, plasma treatment, photochromism treatment, physical vapor deposition, chemical vapor deposition, coating).

<Usage>

The resin composition of the present invention has good moldability and mechanical strength and is reduced in the surface precipitation of an oligomer derived from the aliphatic polyester-based resin (A) and therefore, the molded body obtained by molding the resin composition of the present invention is suitably used in a wide range of applications such as agricultural material, building material and packaging material for a variety of foods, drugs, sundry goods and the like taking a form of a liquid, a powder/granule or a solid. Specific examples of the application include an injection molded article (such as tray for fresh food, container for fast food and outdoor leisure product), an extrudate (a film such as fishing line, fishing net, clayish land net and water-retaining sheet), a hollow molded article (e.g., bottle), an agricultural film, a coating material, a fertilizer coating material, a laminate film, a plate, a stretched sheet, a multifilament, a nonwoven fabric, a flat yarn, a staple, a crimped fiber, a striped tape, a split yarn, a composite fiber, a blow bottle, a foam, a shopping bag, a garbage bag, a compost bag, a cosmetic container, a detergent container, a bleach container, a rope, a binding material, a sanitary cover stock material, a cool box, a cushioning material film, a multifilament, a synthetic paper, and a medical material such surgical yarn, suture, artificial bone, artificial skin, DDS (e.g., microcapsule) and wound coverage material.

The resin composition of the present invention has good moldability and mechanical strength and is reduced in the surface precipitation of an oligomer derived from the aliphatic polyester-based resin (A) and therefore, is preferably applied to a shopping or garbage bag produced from a film formed by inflation molding.

Furthermore, the resin composition can be used for an information electron material such as toner binder and thermal transfer ink binder, an electrical product housing, an automotive interior component such as instrument panel, sheet and pillar, an automotive exterior structure material such as bumper, front grille and wheel cover. Among these applications, more preferred are a packaging material such as packaging film, bag, tray, bottle, buffered foam and fish box, and an agricultural material such as mulching film, tunnel film, house film, sunshade, anti-grass sheet, ridged sheet, sprouting sheet, clayish land mat, raising seedling bed and flowerpot.

EXAMPLES

The present invention is described in greater detail below by referring to Examples, but as long as its purport is observed, the present invention is not limited to the following Examples by any means. The raw materials employed in Examples and the measurement methods for physical properties and evaluation items are as follows.

<Resins Used>

[Aliphatic Polyester-Based Resin (A-1)]

Polybutylene succinate-based resin GS Pla produced by Mitsubishi Chemical Corporation (grade name: AZ91TN, content of cyclic dimer contained in resin: 7,900 ppm).

[Aliphatic Polyester-Based Resin (A-2)]

GS Pla produced by Mitsubishi Chemical Corporation (grade name: AD92WN, content of cyclic dimer contained in resin: 5,100 ppm).

[Thermoplastic Resin (B)]

Polybutylene terephthalate adipate-based resin Ecoflex produced by BASF (grade name: FBX7011).

[Starch (C)]

Corn starch produced by Japan Corn Starch Co., Ltd. (grade name: Y-3P, water content: 12%, average particle diameter: 15 μm). The average particle diameter of the starch used as the raw material of this product is not the average particle diameter of the starch dispersed phase dispersed in the resin composition but is an average value of maximum particle diameters determined by observing the raw material starch particle through an optical microscope and measuring arbitrary 50 starch particles.

[Plasticizer (D) for Starch]

Special grade glycerin produced by Wako Pure Chemical Industries, Ltd.

<Water Amount>

The measurement of water amount in the resin pellet was performed by the Karl Fischer method (moisture vaporization-coulometric titration). For the analysis, an apparatus equipped with CA-200 (coulometric titration moisture meter) and VA-200 (water vaporizer), manufactured by Mitsubishi Chemical Analytech Co., Ltd., was used. Using AQUAMICRON (registered trademark) AX (anolyte) and AQUAMICRON (registered trademark) CXU (catholyte) both produced by Mitsubishi Chemical Corporation, the measurement was performed at 180° C. by flowing nitrogen as a carrier gas at about 300 mL/min under the conditions of EndSence=0.1 μg·$H_2O$/Sec and Delay=2 min.

<Measurement Method of Tearing Strength>

The Elmendorf tearing strength was measured in accordance with JIS K7128.

<Measurement Method of Tensile Elastic Modulus>

The tensile elastic modulus was measured using a precision universal tester, Autograph AG-2000, manufactured by Shimadzu Corporation in accordance with JIS K7127.

<Observation of Sea-Island Structure and Calculation of Average Particle Diameter>

The raw materials shown in Examples were kneaded in an extruder, withdrawn as a strand, cooled in a water tank at an ordinary temperature and cut by a strand cutter, and the obtained pellet was dried at 60° C. for 8 hours under a dry nitrogen flow. The resin pellet was cooled using liquid nitrogen for 10 minutes, and an ultrathin section of the resin composition pellet was prepared using a cryomicrotome (composed of EM-UC6 Microtome manufactured by LEICA and EM-FC6 Cryochamber manufactured by LEICA) at about −140° C. At this time, the cutting was done in the direction along a face parallel to the TD direction (the section was sampled by carefully cutting almost the center part of the pellet). Thereafter, the temperature was returned to ordinary temperature while spraying dry nitrogen on the section (so as to prevent frosting). The section was subjected to $RuO_4$ dyeing and then observed using JEM-1230 TEM (transmission electron microscope) manufactured by JEOL Ltd. at 120 KV, whereby the sea-island structure was observed.

Furthermore, the range of 5 μm×5 μm of the obtained TEM image was analyzed by Winroof manufactured by Mitani Corporation, and the average value (average particle diameter) of the equivalent-circle diameter (the diameter when an area was measured and a true circle having the area was drawn) of the starch phase was determined. Hereinafter, this average value is sometimes referred to as the average particle diameter of the starch phase.

<Evaluation of Cyclic Dimer Content>

As a pretreatment of the sample, 1) 0.5 g of the sample was quantitated and dissolved in 5 mL of chloroform, when some components were not dissolved in chloroform, the chloroform insoluble portion was removed by filtration;

2) 10 mL of methanol was added to the chloroform solution to reprecipitate the polymer portion;

3) 1 mL of the supernatant was taken from the solution and dried to solid by blowing nitrogen gas, and the dried solid sample was dissolved by adding 1 mL of acetonitrile thereto, and 4) the acetonitrile soluble component was filtered through a filter and used as the measurement sample.

The aliphatic polyester-based resin (A) in the pretreated measurement sample and the content (ppm by mass) of the cyclic dimer contained in the resin composition were quantitatively determined by using liquid chromatography "LC-10A" manufactured by Shimadzu Corporation, using acetonitrile/water (volume ratio: 4/6) for the mobile phase, and using column "SHISEIDO CAPCELL PAK C-18 TYPE MG" manufactured by Shiseido Co., Ltd.

<Evaluation of Oligomer Precipitation>

The film composed of the obtained thermoplastic resin composition was stored for 1 month under the conditions of 23° C. and 50% RH and thereafter, the film appearance was observed with an eye and evaluated according to the following criteria.

Good (A): White precipitate ascribable to cyclic dimer was not visually recognized on the film surface Bad (B): White precipitate ascribable to cyclic dimer could be visually recognized on the film surface <Evaluation Method of Film Formability>

In Examples 1 to 8 and Comparative Examples 1 to 3, the moldability was evaluated by rating "B" when perforation, fusion or the like was generated and the film could not be stably produced, and rating "A" when the film could be stably produced.

In Examples 9 to 16 and Comparative Examples 4 to 9, the easiness of molding when inflation molding was performed was evaluated according to the following criteria.

Good (A): Molding to a predetermined thickness (20 μm) at a predetermined temperature (160° C.) was possible.

Bad (B): Molding to a predetermined thickness (20 μm) at a predetermined temperature (160° C.) was impossible.

<Evaluation of Surface Characteristics>

The film composed of the obtained thermoplastic resin composition was evaluated with an eye and a hand and rated according to the following criteria.

Good (A): Starch aggregates were not observed or bleed-out of hydroxyl group-containing organic compound to the surface did not occur.

Bad (B): Starch aggregates were observed or bleed-out of hydroxyl group-containing organic compound to the surface occurred.

Example 1

Figure 2:
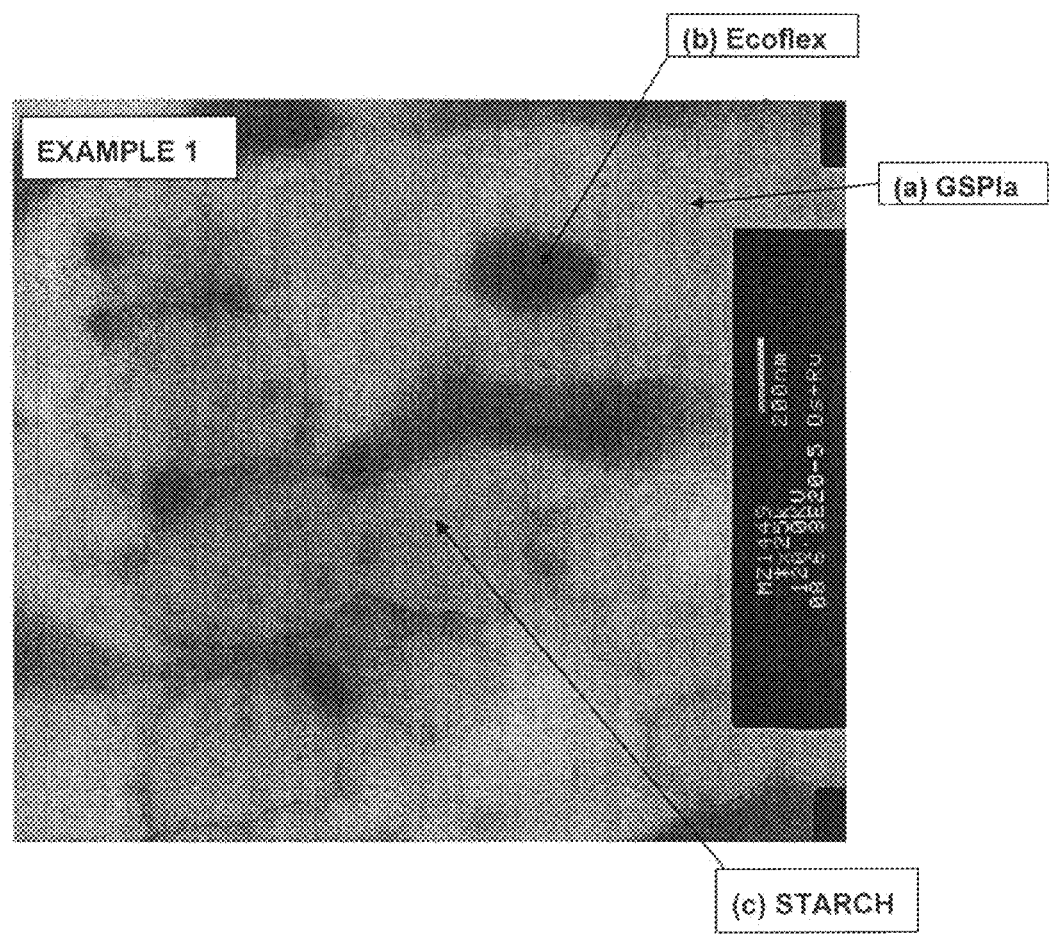
FIG. 2 is a transmission electron micrograph of the resin composition pellet produced in Example 1.

36 Mass % of the starch (C), 18 mass % of the thermoplastic resin (B) and 6 mass % of the plasticizer (D) for starch were kneaded using twin-screw extruder TEX30 (22 cylinder, L/D=77) manufactured by Japan Steel Works Ltd. During kneading, the temperature was set to 80 to 150° C. and the screw rotation speed was set to 150 to 300 rpm. After removing water vapor through a vent part, 40 mass % of the aliphatic polyester-based resin (A-2) was further side-fed and kneaded. The obtained resin composition was extruded in a strand form from a die, cooled in a water tank and cut to obtain a white pellet. FIG. 2 shows a TEM photograph of the pellet section. It is seen from FIG. 2 that the obtained pellet has a special morphology that GSPla forms a matrix phase and the starch and Ecoflex each forms a dispersed phase. Also, from the TEM observation image of the pellet, the average particle diameter of the starch phase was calculated to be 0.3 μm.

The obtained pellet of the resin composition was dried at 70° C. for 8 hours in a nitrogen atmosphere and using this pellet, a film of 30 μm in thickness was formed by inflation molding. The inflation molding was performed using Model E30SP manufactured by Enpla-Sangyo K.K. under the conditions of a blow ratio of 3, a folded diameter of 360 mm and a molding temperature of 140° C. The contents implemented and the evaluations results of the obtained film are shown in Table 1.

In Table 1, the denotation of "-" in the column of "mass %" of the composition indicates that the material was not added; the denotation "-" in the column of the process indicates that the process was not performed; and the denotation "-" in the column of the evaluation results indicates that the evaluation was omitted.

Examples 2 and 3

Pellets were obtained by the method in accordance with Example 1 except for changing the amount ratio of respective components as shown in Table 1. The pellet specimens were observed by TEM and each was confirmed to have a special morphology that, similarly to Example 1, GSPla forms a matrix phase and the starch and Ecoflex each forms a dispersed phase. Also, from the TEM observation image of each pellet, the average particle diameter of the starch phase was calculated to be 0.3 μm. Furthermore, each pellet was inflation-molded in the same manner as in Example 1. The contents implemented and the evaluation results of the obtained film are shown in Table 1.

Comparative Example 1

A pellet was obtained by the method in accordance with Example 1 except that 37 mass % of the starch (C), 18 mass % of the aliphatic polyester resin (A-2) and 7 mass % of the plasticizer (D) for starch were fed to the twin-screw extruder and kneaded and after removing water vapor through the vent part, 38 mass % of the aliphatic polyester resin (A-2) was again side-fed and kneaded. The average particle diameter of the starch phase calculated from the TEM observation image of the pellet was as large as 10 μm and many grains were observed. Also, the pellet was inflation-molded in the same manner as in Example 1, as a result, many perforations were generated and a film could not be stably obtained.

Comparative Example 2

A pellet was obtained by the method in accordance with Example 1 except that 37 mass % of the starch (C), 18 mass % of the thermoplastic resin (B) and 7 mass % of the plasticizer (D) for starch were fed to the twin-screw extruder and kneaded and after removing water vapor through the vent part, 38 mass % of the thermoplastic resin (B) was again side-fed and kneaded. The average particle diameter of the starch phase calculated from the TEM observation image of the pellet was as small as 0.3 μm. The pellet was inflation-molded in the same manner as in Example 1. The average particle diameter of the starch phase determined from the TEM image was as small as 0.3 μm. The inflation molding could be stably performed, and a film with smooth surface could be obtained. The contents implemented and the evaluation results of the obtained film are shown in Table 1.

Comparative Example 3

A pellet was obtained by the method in accordance with Example 1 except that 37 mass % of the starch (C), 19 mass % of the thermoplastic resin (B), 7 mass % of the plasticizer (D) for starch and 37 mass % of the aliphatic polyester-based resin (A-2) were fed en bloc to the twin-screw extruder and kneaded and after removing water vapor through the vent part, the mixture was successively kneaded. The average particle diameter of the starch phase calculated from the TEM observation image of the pellet was as large as 10 μm and many grains were observed. Also, the pellet was inflation-molded in the same manner as in Example 1, as a result, many perforations were generated and a film could not be stably obtained.

All of the films obtained using the resin composition of the present invention had good moldability, and a film excellent in both tensile elastic modulus and tearing strength was obtained. On the other hand, in Comparative Example 2, a film having good tearing strength could be obtained, but the tensile elastic modulus was very low and the film was elongated when pulled and could not be applied to a shopping bag or the like.

Example 4

The pellet of the resin composition obtained in Example 1 was directly inflation-molded in the same manner as in Example 1 except for not being dried. The water amount of the pellet subjected to molding was 2.1 mass %. The contents implemented and the evaluation results of the obtained film are shown in Table 1.

The film of Example 4 could be shaped in a cylindrical form, but the inner surfaces of the film were fused together and this film was inferior to the film of Example 1.

Examples 5 to 8

Resin compositions and films were prepared under the same conditions as in Example 1 except for changing the amount ratio of respective components to the ratio shown in Table 1. The contents implemented and the evaluations results of the obtained film are shown in Table 1.

Among the films obtained using the resin composition of the present invention, those obtained from the resin composition whose water amount was adjusted to less than 1 wt % were particularly excellent in both tensile elastic modulus and tearing strength.

<2. Production of Resin Composition>
[2.1. Aliphatic Polyester-Based Resin (A)]

As the aliphatic polyester-based resin (A), the following aliphatic polyester-based resin (A-3) was used, in addition to the aliphatic polyester-based resin (A-1) and the aliphatic polyester-based resin (A-2).

Production Example 1

Production Process of Aliphatic Polyester-Based Resin (A-3)

200 Parts by mass of acetone per 100 parts by mass of the aliphatic polyester (A-1) was charged into a reaction vessel, the mixture was heated to a temperature of 50° C. and left standing for 12 hours. After the completion of washing, the washing solution was filtered in the atmosphere to separate the wet pellet and the washing filtrate. The wet pellet recovered was vacuum-dried at 80° C. for 15 hours to obtain the aliphatic polyester-based resin (A-3). The cyclic dimer content measured by the above-described method was 580 ppm.
[2.2. Other Additives]

As the carbodiimide compound, Carbodilite HMV-8CA (produced by Nisshinbo Chemical Inc.) was used.

Example 9

A step of feeding 30 parts by mass of the starch (C) (Y-3P produced by Japan Corn Starch Co., Ltd.; water content: 12%), 21 parts by mass of the thermoplastic resin (B) (polybutylene terephthalate adipate-based resin Ecoflex produced by BASF (grade name: FBX7011)) and 6.6 parts by mass of the plasticizer (D) for starch (special grade glycerin produced by Wako Pure Chemical Industries, Ltd.) to a hopper of a twin-screw extruder (TEX30, manufactured by Japan Steel Works Ltd.; 22 cylinder, L/D=77) and mixing these by keeping the maximum temperature to 170° C. or less, and a step of subsequently feeding 42.4 parts by mass of the aliphatic polyester-based resin (A-1) from the side feeder and mixing the corn starch, Ecoflex, glycerin and aliphatic polyester-based resin by keeping the maximum temperature to 170° C. or less were sequentially performed in the same extruder, and without performing suction by a vacuum vent, the mixture was extruded from a die to obtain a white resin composition. The average particle diameter of the starch phase of the obtained pellet was 0.6 μm. Thereafter, the pellet of the resin composition was dried at 60° C. for 8 hours in a nitrogen atmosphere. The cyclic dimer content measured by the above-described method was 3,300 ppm based on the entire resin composition. This was 7,783 ppm in terms of the content per the aliphatic polyester-based resin (A-1) in the resin composition, and the amount of the cyclic dimer was not greatly changed in the extrusion step.

The obtained resin composition was inflation-molded at a molding temperature of 150° C. by using an inflation molding machine to form a film of 20 μm in thickness. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 10

A white resin composition was obtained by performing extrusion of the resin composition without making a change in Example 9 except for performing suction by a vacuum vent. Thereafter, the pellet of the resin composition was dried at 60° C. for 8 hours in a nitrogen atmosphere. The cyclic dimer content measured by the above-described method was 3,050 ppm based on the entire resin composition. This was 7,193 ppm in terms of the content per the aliphatic polyester-based resin (A-1) in the resin composition, and the content of the cyclic dimer per the aliphatic polyester-based resin (A) was changed due to addition of the devolatilization step using a vacuum vent. The obtained resin composition was inflation-molded at a molding temperature of 150° C. by using an inflation molding machine to form a film of 20 μm in thickness. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 11

16.7 Parts by mass of the resin composition obtained in Example 9, 76.8 parts by mass of the aliphatic polyester-based resin (A-1) and 6.5 parts by mass of the thermoplastic resin (B) were charged into a twin-screw extruder (twin-screw extrude (KZW15) manufactured by Technovel Corporation) through a hopper and kneaded by keeping the maximum temperature to 170° C. or less. The obtained pellet of the resin composition was dried at 60° C. for 8 hours in a nitrogen atmosphere. The cyclic dimer content measured by the above-described method was 6,600 ppm based on the entire resin composition. This was 7,867 ppm in terms of the content per the aliphatic polyester-based resin (A-1) in the resin composition, and the amount of cyclic dimer was not greatly changed in the extrusion step.

The obtained resin composition was inflation-molded at a molding temperature of 150° C. by using an inflation molding machine to form a film of 20 μm in thickness. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 12

A resin composition was obtained by performing melting and kneading by the same method as in Example 1 except that in Example 9, 33.5 parts by mass of the aliphatic polyester-based resin (A-1), 15.0 parts by mass of the thermoplastic resin (B), 35.5 parts by mass of the starch (C) and 16 parts by mass of the plasticizer (D) for starch were used. The cyclic dimer content measured by the above-described method was 2,600 ppm based on the entire resin composition. This was 7,755 ppm in terms of the content per the aliphatic polyester-based resin (A-1) in the resin composition, and the amount of the cyclic dimer was not greatly changed in the extrusion step.

Film forming was performed by the same method as in Example 9. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 13

A resin composition was obtained by performing melting and kneading by the same method as in Example 10 except that in Example 10, 44.2 parts by mass of the aliphatic polyester-based resin (A-1), 15.0 parts by mass of the thermoplastic resin (B), 35.5 parts by mass of the starch (C) and 5.3 parts by mass of the plasticizer (D) for starch were used. The cyclic dimer content measured by the above-described method was 3,180 ppm based on the entire resin composition. This was 7,199 ppm in terms of the content per the aliphatic polyester-based resin (A-1) in the resin composition and the amount of the cyclic dimer was not greatly changed.

Film forming was performed by the same method as in Example 9. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 14

A resin composition was obtained by performing melting and kneading by the same method as in Example 10 except that in Example 10, the aliphatic polyester-based resin (A-1) was changed to 43.7 parts by mass of the aliphatic polyester-based resin (A-2) and 25.0 parts by mass of the thermoplastic resin (B), 25.0 parts by mass of the starch (C) and 6.3 parts by mass of the plasticizer (D) for starch were used. The cyclic dimer content measured by the above-described method was 2,000 ppm based on the entire resin composition. This was 4,577 ppm in terms of the content per the aliphatic polyester-based resin (A-2) in the resin composition.

Film forming was performed by the same method as in Example 9. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 15

A resin composition was obtained by performing melting and kneading by the same method as in Example 9 except that in Example 9, the aliphatic polyester-based resin (A-1) was changed to 33.4 parts by mass of the aliphatic polyester-based resin (A-2) and 19.7 parts by mass of the thermoplastic resin (B), 39.4 parts by mass of the starch (C) and 7.5 parts by mass of the plasticizer (D) for starch were used. The cyclic dimer content measured by the above-described method was 1,700 ppm based on the entire resin composition. This was 5,088 ppm in terms of the content per the aliphatic polyester-based resin (A-2) in the resin composition.

Film forming was performed by the same method as in Example 9. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Example 16

A resin composition was obtained by performing melting and kneading by the same method as in Example 15 except that in Example 15, a carbodiimide compound (Carbodilite HMV-8CA; 0.4 parts by mass based on the resin composition obtained) was side-fed in addition to the aliphatic polyester-based resin (A-2). The cyclic dimer content measured by the above-described method was 1,650 ppm based on the entire resin composition. This was 4,938 ppm in terms of the content per the aliphatic polyester-based resin (A-2) in the resin composition.

Film forming was performed by the same method as in Example 9. The stability of the melt film was better than that in Example 15. The obtained film was free of an extraneous material or the like such as aggregate and was semitransparent white, and oligomer precipitation was not recognized even after standing for 1 month under the conditions of 23° C. and 50% RH. The contents implemented and the evaluations results of the obtained film are shown in Table 1.

Comparative Example 4

100 Parts by mass of the aliphatic polyester-based resin (A-1) was subjected to inflation molding under the same conditions as in Example 12 to obtain a film of 20 μm in thickness. The obtained film was free of an extraneous material or the like such as aggregate and was semitransparent but when left standing for 1 month under the conditions of 23° C. and 50% RH, a large amount of oligomer precipitation was recognized. The contents implemented and the evaluations results of the obtained film are shown in Table 1.

Comparative Example 5

100 Parts by mass of the aliphatic polyester-based resin (A-2) was subjected to inflation molding under the same conditions as in Example 12 to obtain a film of 20 μm in thickness. The obtained film was free of an extraneous material or the like such as aggregate and was semitransparent but when left standing for 1 month under the conditions of 23° C. and 50% RH, a large amount of oligomer precipitation was recognized. The contents implemented and the evaluations results of the obtained film are shown in Table 1.

Comparative Example 6

100 Parts by mass of the aliphatic polyester-based resin (A-3) obtained in Production Example 1 was subjected to inflation molding under the same conditions as in Example 12 to obtain a film of 20 μm in thickness. The obtained film was free of an extraneous material or the like such as aggregate and was semitransparent. The obtained film was left standing for 1 month under the conditions of 23° C. and 50% RH, as a result, the surface condition was good without oligomer precipitation. However, since acetone washing for 12 hours was performed in the production process of the aliphatic polyester-based resin (A-3), the productivity of the resin composition was decreased, the washing cost was increased, and there was a problem of acetone odor. The contents implemented and the evaluations results of the obtained film are shown in Table 1.

Comparative Example 7

A resin composition was obtained by performing melting and kneading by the same method as in Example 13 except that in Example 13, the aliphatic polyester-based resin (A-1) was changed to 46.6 parts by mass of the aliphatic polyester-based resin (A-2) and 21.0 parts by mass of the thermoplastic resin (B), 30.0 parts by mass of the starch (C) and 2.4 parts by mass of the plasticizer (D) for starch were used.

The cyclic dimer content measured by the above-described method was 2,150 ppm based on the entire resin composition. This was 4,614 ppm in terms of the content per the aliphatic polyester-based resin (A-2) in the resin composition.

Film forming was performed by the same method as in Example 9. The obtained film had many aggregates derived from the starch, and the average particle diameter of the starch phase was 10 μm. The film of 20 μm in thickness was a sample being incapable of inflation molding and having poor appearance and therefore, forming in thickness of 60 μm was performed. The resulting film was left standing for 1 month under the conditions of 23° C. and 50% RH, as a result, a large amount of oligomer precipitation was recognized. The contents implemented and the evaluations results of the obtained film are shown in Table 1.

Comparative Example 8

A resin composition was obtained by performing melting and kneading in the same manner as in Comparative Example 7 except that in Comparative Example 7, the aliphatic polyester-based resin (A-2) was changed to 31 parts by mass of the aliphatic polyester-based resin (A-1) and 18 parts by mass of the plasticizer (D) for starch was used. The cyclic dimer content measured by the above-described method was 2,200 ppm based on the entire resin composition. This was 7,097 ppm in terms of the content per the aliphatic polyester-based resin (A-1) in the resin composition.

Inflation molding was attempted by the same method as in Example 9, but the resin composition was increased in flowability due to addition of a large amount of glycerin, and inflation molding could not be performed in thickness of 20 μm. Therefore, film forming in thickness of 60 μm was performed. On the film surface, surface sticking due to bleed-out of glycerin was generated. The average particle diameter of the starch phase was 4 μm. When the obtained film was left standing for 1 month under the conditions of 23° C. and 50% RH, oligomer precipitation was not recognized. The contents implemented and the evaluations results of the obtained film are shown in Table 1.

Comparative Example 9

A resin composition was obtained by performing melting and kneading under the same conditions as in Comparative Example 8 except that in Comparative Example 8, 31 parts by mass of the aliphatic polyester-based resin (A-3) obtained in Production Example 2 was used in place of using 31 parts by mass of the aliphatic polyester-based resin (A-1). The cyclic dimer content measured by the above-described method was 150 ppm based on the entire resin composition. This was 484 ppm in terms of the content per the aliphatic polyester-based resin (A-3) in the resin composition.

Inflation molding was performed by the same method as in Example 9 to obtain a film of 20 μm in thickness. The obtained film was free of an extraneous material or the like such as aggregate and was semitransparent. When this film was left standing for 1 month under the conditions of 23° C. and 50% RH, oligomer precipitation was not recognized and the surface condition was good. However, since acetone washing for 12 hours was performed in the production process of the aliphatic polyester-based resin (A-3), the productivity was low and an acetone odor was emitted. The contents implemented and the evaluations results of the obtained film are shown in Table 1.

TABLE 1

| | Composition [mass %] | | | | | | | | | |
|---|---|---|---|---|---|---|---|---|---|---|
| | Aliphatic Polyester Resin (A) | | | Thermoplastic Resin (B) Aromatic-Aliphatic Polyester | Starch (C) Corn Starch | Plasticizer (D) for Starch | | Other Additives Carbodiimide Compound | Process Presence or Absence of Vacuum Deaeration during Kneading |
| | (A-1) | (A-2) | (A-3) | | | Glycerin | Glycerin Content Based on Starch [wt %] | | |
| Example 1 | — | 40 | — | 18 | 36 | 6 | 17% | — | done |
| Example 2 | — | 36 | — | 23 | 34 | 7 | 21% | — | done |
| Example 3 | — | 30 | — | 21 | 42 | 7 | 17% | — | none |
| Example 4 | — | 40 | — | 18 | 36 | 6 | 17% | — | done |
| Example 5 | — | 40 | — | 22 | 32 | 6 | 19% | — | none |
| Example 6 | — | 38 | — | 28 | 28 | 6 | 21% | — | none |
| Example 7 | — | 38 | — | 34 | 23 | 5 | 22% | — | none |
| Example 8 | — | 30 | — | 26 | 37 | 7 | 19% | — | none |
| Example 9 | 42.4 | — | — | 21.0 | 30.0 | 6.6 | 22% | — | none |
| Example 10 | 42.4 | — | — | 21.0 | 30.0 | 6.6 | 22% | — | done |
| Example 11 | 83.9 | — | — | 10.0 | 5.0 | 1.1 | 22% | — | none |
| Example 12 | 33.5 | — | — | 15.0 | 35.5 | 16.0 | 45% | — | none |
| Example 13 | 44.2 | — | — | 15.0 | 35.5 | 5.3 | 15% | — | done |
| Example 14 | — | 43.7 | — | 25.0 | 25.0 | 6.3 | 25% | — | done |
| Example 15 | — | 33.4 | — | 19.7 | 39.4 | 7.5 | 19% | — | none |
| Example 16 | — | 33.4 | — | 19.7 | 39.4 | 7.5 | 19% | 0.4 | none |
| Comparative Example 1 | — | 56 | — | 0 | 37 | 7 | 19% | — | none |
| Comparative Example 2 | — | 0 | — | 56 | 37 | 7 | 19% | — | none |
| Comparative Example 3 | — | 37 | — | 19 | 37 | 7 | 19% | — | none |
| Comparative Example 4 | 100 | — | — | — | — | — | — | — | — |
| Comparative Example 5 | — | 100 | — | — | — | — | — | — | — |
| Comparative Example 6 | — | — | 100 | — | — | — | — | — | — |
| Comparative Example 7 | — | 46.6 | — | 21 | 30 | 2.4 | 8% | — | done |
| Comparative Example 8 | 31 | — | — | 21 | 30 | 18 | 60% | — | done |
| Comparative Example 9 | — | — | 31 | 21 | 30 | 18 | 60% | — | done |

| | Evaluation Results | | | | | | | |
|---|---|---|---|---|---|---|---|---|
| | Average Particle Diameter of Starch Phase [μm] | Tensile Elastic Modulus (MD) [Mpa] | Tearing Strength (MD) [Mpa] | Water Amount of Composition [mass %] | Cyclic Dimer Content Based on Entire Resin Composition [ppm] | Oligomer Precipitation | Surface Characteristic | Film Formability |
| Example 1 | 0.3 | 240 | 150 | 0.1 | 1950 | A | A | A |
| Example 2 | 0.3 | 220 | 110 | 0.1 | 1750 | A | A | A |
| Example 3 | 0.3 | 220 | 120 | 0.1 | 1450 | A | A | A |
| Example 4 | 0.3 | — | — | 2.1 | 1900 | A | A | B |
| Example 5 | 0.3 | 224 | 118 | 0.1 | 1980 | A | A | A |
| Example 6 | 0.3 | 193 | 63 | 0.1 | 1850 | A | A | A |
| Example 7 | 0.3 | 168 | 36 | 0.1 | 1820 | A | A | A |
| Example 8 | 0.3 | 167 | 94 | 0.1 | 1480 | A | A | A |
| Example 9 | 0.6 | 340 | 45 | 0.1 | 3300 | A | A | A |
| Example 10 | 0.6 | 350 | 45 | 0.1 | 3050 | A | A | A |
| Example 11 | 0.7 | 420 | 8 | 0.1 | 6600 | A | A | A |
| Example 12 | 0.7 | 300 | 55 | 0.1 | 2600 | A | A | A |
| Example 13 | 0.7 | 320 | 50 | 0.1 | 3180 | A | A | A |
| Example 14 | 0.3 | 260 | 50 | 0.1 | 2000 | A | A | A |
| Example 15 | 0.4 | 240 | 120 | 0.1 | 1700 | A | A | A |
| Example 16 | 0.4 | 245 | 120 | 0.1 | 1650 | A | A | A |
| Comparative Example 1 | 10 | — | — | 0.1 | 2790 | A | B | B |
| Comparative Example 2 | 0.3 | 120 | 145 | 0.1 | — | — | A | A |
| Comparative Example 3 | 10 | — | — | 0.1 | 1800 | A | B | B |

TABLE 1-continued

| | | | | | | | | |
|---|---|---|---|---|---|---|---|---|
| Comparative Example 4 | — | 500 | 2 | — | 7900 | B | A | A |
| Comparative Example 5 | — | 200 | 4 | — | 5100 | B | A | A |
| Comparative Example 6 | — | 490 | 2 | — | 580 | A | A | A |
| Comparative Example 7 | 10 | — | — | 0.1 | 2150 | B | B | B |
| Comparative Example 8 | 4 | — | — | 0.1 | 2200 | A | B | B |
| Comparative Example 9 | 4 | 320 | 5 | 0.1 | 150 | A | B | A |

In the foregoing pages, the present invention has been described by referring to embodiments what are presently considered to be most practical and preferred, but the present invention is not limited to the embodiments disclosed in the description, and appropriate changes may be made therein in a range not contradicting the gist or idea of the invention that is read from claims and the entire description. It should be understood that a resin composition, a film, a bag product and a production process of the resin composition, which are accompanied with such changes, are included in the technical range of the present invention.

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2008-335336) filed on Dec. 26, 2008, Japanese Patent Application (Patent Application No. 2008-335337) filed on Dec. 26, 2008, Japanese Patent Application (Patent Application No. 2008-335338) filed on Dec. 26, 2008 and Japanese Patent Application (Patent Application No. 2009-157141) filed on Jul. 1, 2009, the contents of which are incorporated herein by way of reference.

INDUSTRIAL APPLICABILITY

According to the present invention, a resin composition having good film formability and/or ensuring excellent mechanical properties, particularly tensile elastic modulus and tearing strength, of a film formed can be provided. This resin composition is excellent in dispersibility of each component in the composition and exhibits good moldability. Therefore, a molded body, particularly a film, obtained from the resin composition can be suitably used as various bag products such as garbage bag and shopping bag.

Also, in a preferred embodiment of the present invention, a resin composition having good moldability and mechanical strength and being reduced in the precipitation of an oligomer derived from the aliphatic polyester-based resin (A), and a production process thereof, can be provided.

Accordingly, the industrial value of the present invention is evident.

DESCRIPTION OF REFERENCE NUMERALS AND SIGNS

100, 10 Twin-screw extruder
1 Cylinder
2 Screw shaft
3 Main raw material feed part
4 Vent part
5 Auxiliary raw material feed part
6 Vent part
7 Die head
20 Water tank
30 Pelletizer
40 Dryer

The invention claimed is:

1. A process for producing a resin composition comprising (A) an aliphatic polyester-comprising resin, (B) a thermoplastic resin other than an aliphatic polyester-comprising resin, (C) starch, and (D) a plasticizer suitable for plasticizing starch, the process comprising:
   mixing (X) a composition comprising (B) the thermoplastic resin other than an aliphatic polyester-comprising resin, (C) starch having an average particle diameter of 1 micron or less, and (D) the plasticizer suitable for plasticizing starch, with (A) the aliphatic polyester-comprising resin.

2. The process of claim 1, wherein during the mixing the amount of water present is less than 1 mass %.

3. The process of claim 1, wherein the mixing forms a resin composition comprising less than 1 mass % water.

4. The process of claim 1, wherein the (A) aliphatic polyester-comprising resin has a cyclic dimer content of 1,000-10,000 ppm.

5. The process of claim 1, wherein the (A) aliphatic polyester-comprising resin comprises a diol unit and a dicarboxylic acid unit as constituent units.

6. The process of claim 1, wherein the (A) aliphatic polyester-comprising resin has a melting temperature of 130° C. or less.

7. The process of claim 1, wherein the (A) aliphatic polyester-comprising resin is at least one selected from the group consisting of a polybutylene succinate-comprising resin and a polybutylene succinate adipate-comprising resin.

8. The process of claim 1, wherein the (D) plasticizer is an organic compound having a hydroxyl group.

9. The process of claim 1, wherein the mixing includes blending all of the raw materials to form a blend composition, and charging the blend composition into a hopper of an extruder and melt-mixing the blend composition in the extruder.

10. The method of claim 1, wherein the mixing includes blending the (A) aliphatic polyester-comprising resin, the (C) starch and the (D) plasticizer and charging the resultant blended composition into a hopper of an extruder.

11. The method of claim 1, wherein the mixing comprises blending the (B) thermoplastic resin, the (C) starch and the (D) plasticizer to form a blend composition and melt-mixing the blend composition in an extruder.

12. The method of claim 1, wherein the mixing is carried out in an extruder to effect melt-mixing.

13. The method of claim 1, wherein (B) the thermoplastic resin other than an aliphatic polyester-comprising resin is an aliphatic-aromatic polyester-based resin.

14. The method of claim 1, wherein (B) the thermoplastic resin other than an aliphatic polyester-comprising resin is a polybutylene adipate terephthalate-based resin.

15. The method of claim 1, wherein the mixing forms a composition having a sea-island structure in which the aliphatic polyester-comprising resin (A) is a matrix phase, the starch (C) is a first dispersed phase, and the thermoplastic resin other than the aliphatic polyester-comprising resin (B) is a second dispersed phase.

16. The method of claim 1, wherein the mixing forms a mixture wherein the aliphatic polyester-comprising resin (A) is a matrix phase, the starch (C) is a first dispersed phase, and the thermoplastic resin other than the aliphatic polyester-comprising resin (B) is a second dispersed phase; wherein an average particle diameter of the first dispersed phase is 0.5 μm or less and the content of the starch (C) is from 30 mass % to 60 mass % based on the entire resin composition (100 mass %), and wherein the plasticizer (D) accounts for from 17 mass % to 55 mass % based on the total weight of the starch (C).

17. The process of claim 1, wherein the mixing is carried out in a twin-screw extruder having a main raw material feed part for feeding raw materials, an auxiliary raw material feed part, and a devolatilization part between the auxiliary raw material feed part and a die head.

18. The process of claim 17, wherein, during the mixing, the (C) starch is fed from the main raw material feed part and the (A) aliphatic polyester-comprising resin is fed from the auxiliary raw material feed part, and devolatilization is carried out in the devolatilization part.

19. The method of claim 1, wherein the (C) starch and the (D) plasticizer are mixed first, then
the (A) aliphatic polyester-comprising resin and the (B) thermoplastic resin are fed to an extruder with a feeding device.

20. The method of claim 19, wherein the feeding device is a side feeder.

21. The method of claim 19, wherein the (B) thermoplastic resin and the (A) aliphatic polyester-comprising resin are melt mixed in the same extruder.

22. The method of claim 16, further comprising:
before the mixing, kneading the thermoplastic resin other than the aliphatic polyester-comprising resin (B), the starch (C) and the plasticizer (D) to form the composition, then adding the aliphatic polyester-comprising resin (A) to the composition and kneading.

* * * * *